(12) United States Patent
Mizuno

(10) Patent No.: US 11,728,590 B2
(45) Date of Patent: Aug. 15, 2023

(54) OPTICAL TRANSCEIVER

(71) Applicant: SUMITOMO ELECTRIC INDUSTRIES, LTD., Osaka (JP)

(72) Inventor: Yasutaka Mizuno, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 228 days.

(21) Appl. No.: 17/446,338

(22) Filed: Aug. 30, 2021

(65) Prior Publication Data

US 2022/0077623 A1 Mar. 10, 2022

(30) Foreign Application Priority Data

Sep. 7, 2020 (JP) ................................. 2020-149900

(51) Int. Cl.
*H01R 13/40* (2006.01)
*H01R 13/514* (2006.01)
*G02B 6/42* (2006.01)

(52) U.S. Cl.
CPC ......... *H01R 13/514* (2013.01); *G02B 6/4246* (2013.01); *G02B 6/4284* (2013.01)

(58) Field of Classification Search
CPC .. H01R 13/514; H01R 13/516; H01R 13/518; G02B 6/4201; G02B 6/4246; G02B 6/4266; G02B 6/4284
USPC ...................................................... 439/625
See application file for complete search history.

(56) References Cited

U.S. PATENT DOCUMENTS

| 11,665,857 | B2 * | 5/2023 | Sharf ................... H01R 12/716 |
| | | | 361/704 |
| 2008/0145004 | A1 | 6/2008 | Ice |
| 2015/0104177 | A1 | 4/2015 | Kato et al. |
| 2016/0192545 | A1 | 6/2016 | Mao et al. |
| 2019/0025530 | A1 | 1/2019 | Wang et al. |
| 2022/0077623 | A1 * | 3/2022 | Mizuno ................ H01R 13/514 |

FOREIGN PATENT DOCUMENTS

JP 2015-079092 4/2015

* cited by examiner

*Primary Examiner* — Khiem M Nguyen
(74) *Attorney, Agent, or Firm* — IPUSA, PLLC

(57) ABSTRACT

An optical transceiver, attachable and detachable along a first direction with respect to an apparatus, includes an optical module having a first surface intersecting the first direction and first and second sleeves extending from the first surface in a direction of the optical transceiver, a housing extending along the first direction and accommodating the optical module, and first and second receptacles connected to the first and second sleeves and aligned according to deviations of the first and second sleeves on the first surface from first and second reference positions, respectively. An accommodating part on one end of the housing along the first direction accommodates the first and second receptacles which are fixed to the housing via a conductive resin filled between the housing and the first and second receptacles.

8 Claims, 21 Drawing Sheets

OPTICAL TRANSCEIVER

CROSS-REFERENCE TO RELATED APPLICATIONS

This application is based upon and claims priority to Japanese Patent Application No. 2020-149900 filed on Sep. 7, 2020, the entire contents of which are incorporated herein by reference.

BACKGROUND OF THE INVENTION

1. Field of the Invention

The present disclosure relates to optical transceivers.

2. Description of the Related Art

In an optical transceiver, a Transmitter Optical Sub-Assembly (TOSA) which transmits an optical signal, and a Receiver Optical Sub-A assembly (ROSA) which receives an optical signal, are individually disposed inside a housing of the optical transceiver. Further, in the optical transceiver, an optical assembly which includes the TOSA and the ROSA is disposed inside the housing of the optical transceiver.

SUMMARY OF THE INVENTION

According to one aspect of the present disclosure, an optical transceiver, attachable and detachable along a first direction with respect to an external apparatus, includes an optical module having a first surface intersecting the first direction, a first sleeve and a second sleeve respectively extending from the first surface in a direction in which the optical transceiver is detached from the external apparatus; a housing having a parallelepiped shape extending along the first direction, and configured to accommodate the optical module; a first receptacle, connected to the first sleeve, and aligned according to a deviation of the first sleeve on the first surface from a first reference position; and a second receptacle, connected to the second sleeve, and aligned according to a deviation of the second sleeve on the first surface from a second reference position, wherein the housing has an accommodating part, disposed at one end of the housing along the first direction, and configured to accommodate the first receptacle and the second receptacle, and wherein the first receptacle and the second receptacle are fixed to the housing via a conductive resin filled between an inner peripheral surface of the housing and outer peripheral surfaces of the first receptacle and the second receptacle.

Other objects and further features of the present disclosure will be apparent from the following detailed description when read in conjunction with the accompanying drawings.

DETAILED DESCRIPTION

Details of Embodiments of Present Disclosure

Figure 1:
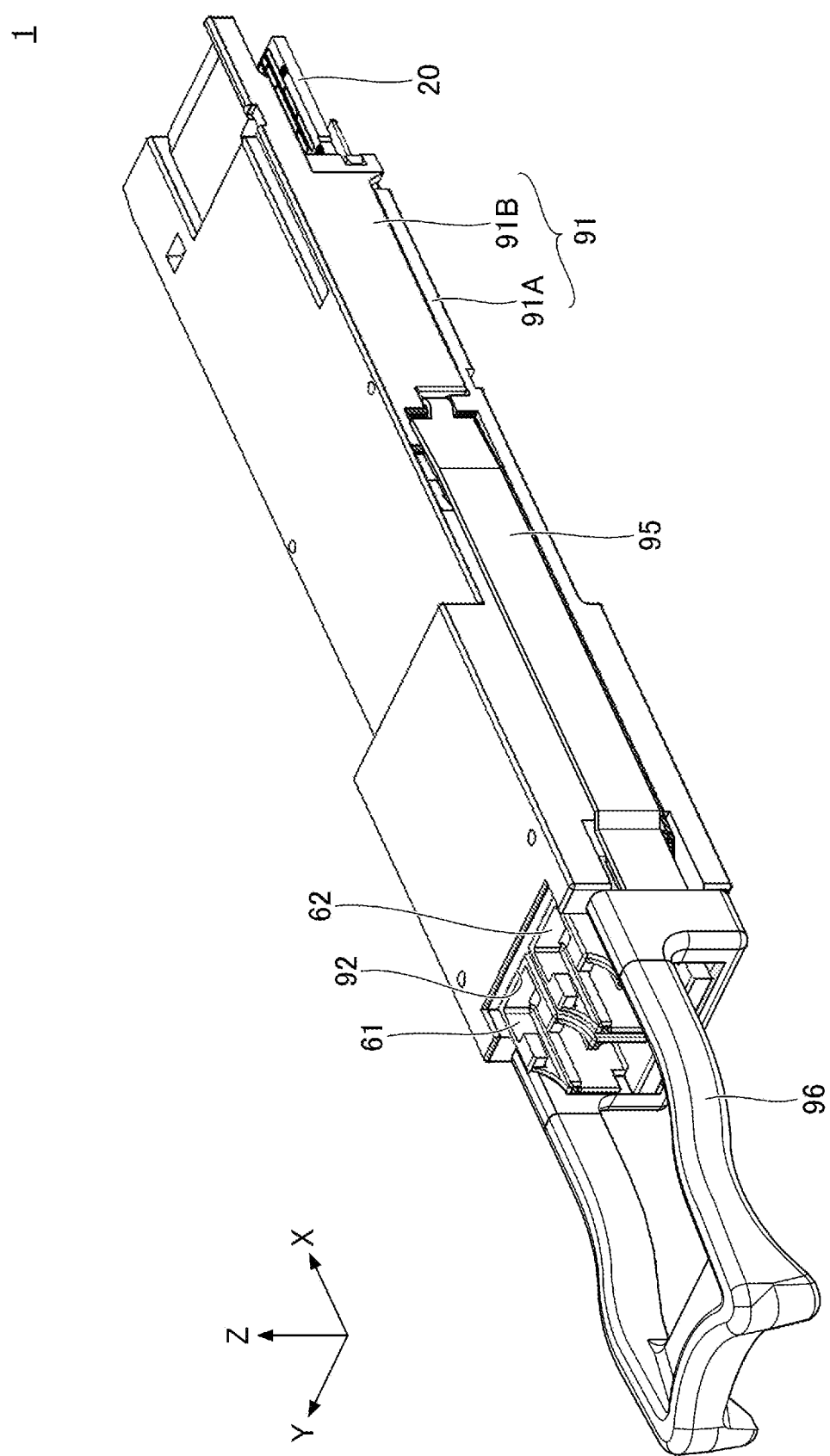
FIG. 1 is a perspective view illustrating an optical transceiver according to one embodiment.

Optical transceivers according to specific embodiments of the present disclosure will be described in the following, with reference to the drawings. The present invention is not limited to the following embodiments, and may include various variations, modifications, and substitutions within the scope of the present invention. In the description of the drawings, the same or corresponding elements are designated by the same reference numerals, and a repeated description of the same or corresponding elements may be omitted. In addition, for sake of facilitating the understanding of the embodiments, the drawings may be simplified in part, and the dimension or size ratio or the like is not limited to those illustrated in the drawings.

Embodiments of the present disclosure relate to an optical transceiver which is insertable (attachable or loadable) and extractable (detachable or removable) with respect to a cage of a host system, for example. The host system is an example of an external apparatus, such as an optical transmission apparatus or the like, for example. The optical transceiver, attachable with respect to the cage, includes being physically connectable and electrically connectable to the host system, for example. Further, the optical transceiver, detachable with respect to the cage, includes being physically disconnectable and electrically disconnectable from the host system, for example. FIG. 1 is a perspective view illustrating the optical transceiver according to one embodiment. For the sake of convenience, an XYZ orthogonal coordinate system is set in each of the figures. An X-axis direction is an example of a first direction. In the present disclosure, a planar shape refers to a shape in a plan view viewed in a Z-axis direction.

As illustrated in FIG. 1, an optical transceiver 1 according to one embodiment includes a housing 91, a slider 95, and a pull tab 96.

The housing 91 will be described. The housing 91 has a generally parallelepiped shape which is elongated in a longitudinal direction. For example, when viewed in a direction intersecting the longitudinal direction, the housing 91 has a planar shape extending in the longitudinal direction and in a short direction. In this embodiment, the longitudinal direction extends along the X-axis direction, and the short direction extends along a Y-axis direction. The short direction is the direction intersecting the longitudinal direction. The housing 91 and pull tab 96 are disposed at positions opposite to each other along the longitudinal direction. For example, the housing 91 is disposed in the +X direction with respect to the pull tab 96, and the pull tab 96 is disposed in the −X direction with respect to the housing 91. The +X direction refers to the X-axis direction in which a value of X increases, and the −X direction refers to the X-axis direction in which the value of X decreases. The housing 91 includes a lower housing 91A, and an upper housing 91B, for example. The lower housing 91A and the upper housing 91B are disposed at positions opposite to each other along a height direction. The height direction is along the Z-axis direction. The height direction intersects the longitudinal direction and the short direction. For example, the upper housing 91B is disposed in the +Z direction with respect to the lower housing 91A, and the lower housing 91A is disposed in the −Z direction with respect to the upper housing 91B. The +Z direction refers to the Z-axis direction in which a value of Z increases, and the −Z direction refers to the Z-axis direction in which the value of Z decreases. For example, when viewed in the height direction, the housing 91 has a planar shape extending in the longitudinal direction and the short direction. The upper housing 91B has an interior space for accommodating components. The interior space opens in the −Z direction. The lower housing 91A is fixed to the upper housing 91B so as to cover and close the opening of the upper housing 91B. The lower housing 91A and the upper housing 91B may be made of a metal, for example.

An accommodating part 92, which accommodates a first receptacle 61 for light transmission and a second receptacle 62 for light reception, is provided at one end (end on the side of the −X direction) of the housing 91 along the X-axis direction. The second receptacle 62 is disposed at a position more toward the −Y direction than the first receptacle 61. The +Y direction refers to the Y-axis direction in which a value of Y increases, and the −Y direction refers to the Y-axis direction in which the value of Y decreases. The optical transceiver 1 transmits an optical signal via an optical fiber connected to the first receptacle 61, and receives an optical signal via another optical fiber connected to the second receptacle 62. The optical transceiver 1 is connected to another optical transceiver via the optical fibers. The optical signal transmitted from the optical transceiver 1 is received by the other optical transceiver, and the optical signal transmitted by the other optical transceiver is received by the optical transceiver 1. The first receptacle 61 and the second receptacle 62 are not accommodated inside the cage when the housing 91 is inserted into the cage of the host system, and face outside the host system. The first receptacle 61 and the second receptacle 62 are connectable to optical connectors provided on tip ends of the respective optical fibers. In the following description, the side (−X direction) of the housing 91 provided with the accommodating part 92 may be referred to as a front (or frontward) of the housing 91, and the opposite side (+X direction) of the housing 91 may be referred to as a rear (or rearward) of the housing 91. The housing 91 can be inserted (attached or loaded) in the +X direction into the cage of the host system. The housing 91 can be detached (extracted or removed) in the −X direction from the cage of the host system, by pulling the pull tab 96. The first receptacle 61 and the second receptacle 62 may be made of a metal, for example.

The slider 95 is slidably mounted on the upper housing 91B in a manner slidable in the X-axis direction, for example. The pull tab 96 is fixed to the slider 95. When a predetermined length of the housing 91 is inserted into the cage along the longitudinal direction, the housing 91 is stopped and is engaged by tabs of the cage. In a state where the housing 91 is engaged by the tabs of the cage, the housing 91 cannot be detached from the cage even if the housing 91 is pulled, for example. The slider 95 includes a function to disengage the housing 91 from the cage of the host system. That is, when a user holds and pulls the pull tab 96 frontward (in the −X direction), the slider 95 slides to release the engagement by the tabs of the cage, thereby enabling the optical transceiver 1 to be pulled out of the cage. The slider 95 may be made of a metal, for example. The pull tab 96 may be made of a resin, for example.

Figure 2:
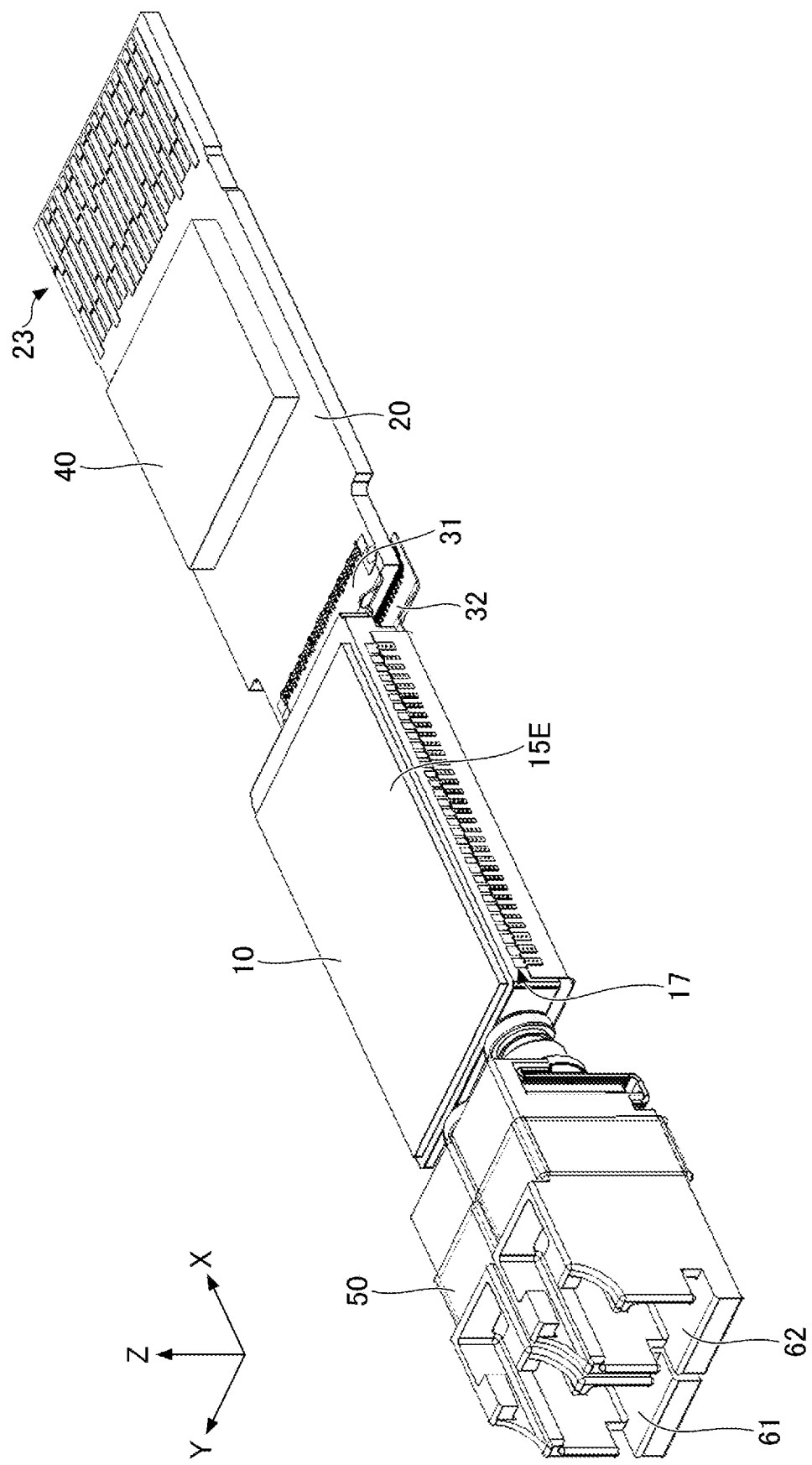
FIG. 2 is a perspective view illustrating components accommodated in a housing of the optical transceiver.

Next, the components accommodated in the housing 91 will be described. FIG. 2 is a perspective view illustrating the components accommodated in the housing 91.

As illustrated in FIG. 2, an IC-TROSA 10, a wiring board 20, Flexible Printed Circuits (FPCs) 31 and 32, and a Digital signal Processor (DSP) 40 are accommodated in the housing 91. The IC-TROSA 10 and the wiring board 20 are connected via the FPCs 31 and 32.

The wiring board 20 has a planar shape extending in the longitudinal direction and the short direction. For example, the wiring board 20 has a rectangular outer shape elongated in the X-axis direction. For example, the DSP 40 is mounted on an upper surface of the wiring board 20. The FPCs 31 and 32 are connected to a front end of the wiring board 20. At the front end of the wiring board 20, one end (rear end) of the FPC 31 is connected to the upper surface of the wiring board 20, and one end (rear end) of the FPC 32 is connected to a lower surface of the wiring board 20. A terminal group 23, including a plurality of electrical terminals, is provided at a rear end of the wiring board 20. When the optical transceiver 1 is inserted into the cage of the host system, the terminal group 23 connects to a plurality of terminals provided in the cage. For example, the terminal group 23 forms an electrical plug, and fits into an electrical socket formed by the plurality of terminals provided in the cage.

When the electrical plug is fitted into the electrical socket, predetermined electrical terminals of the terminal group 23 are connected to predetermined terminals of the plurality of terminals provided in the cage, respectively, to make a 1:1 electrical connection. When the optical transceiver 1 engages the cage and the electrical plug fits into the electrical socket, power from the host system is supplied to the optical transceiver 1 to activate the optical transceiver 1.

Figure 3:
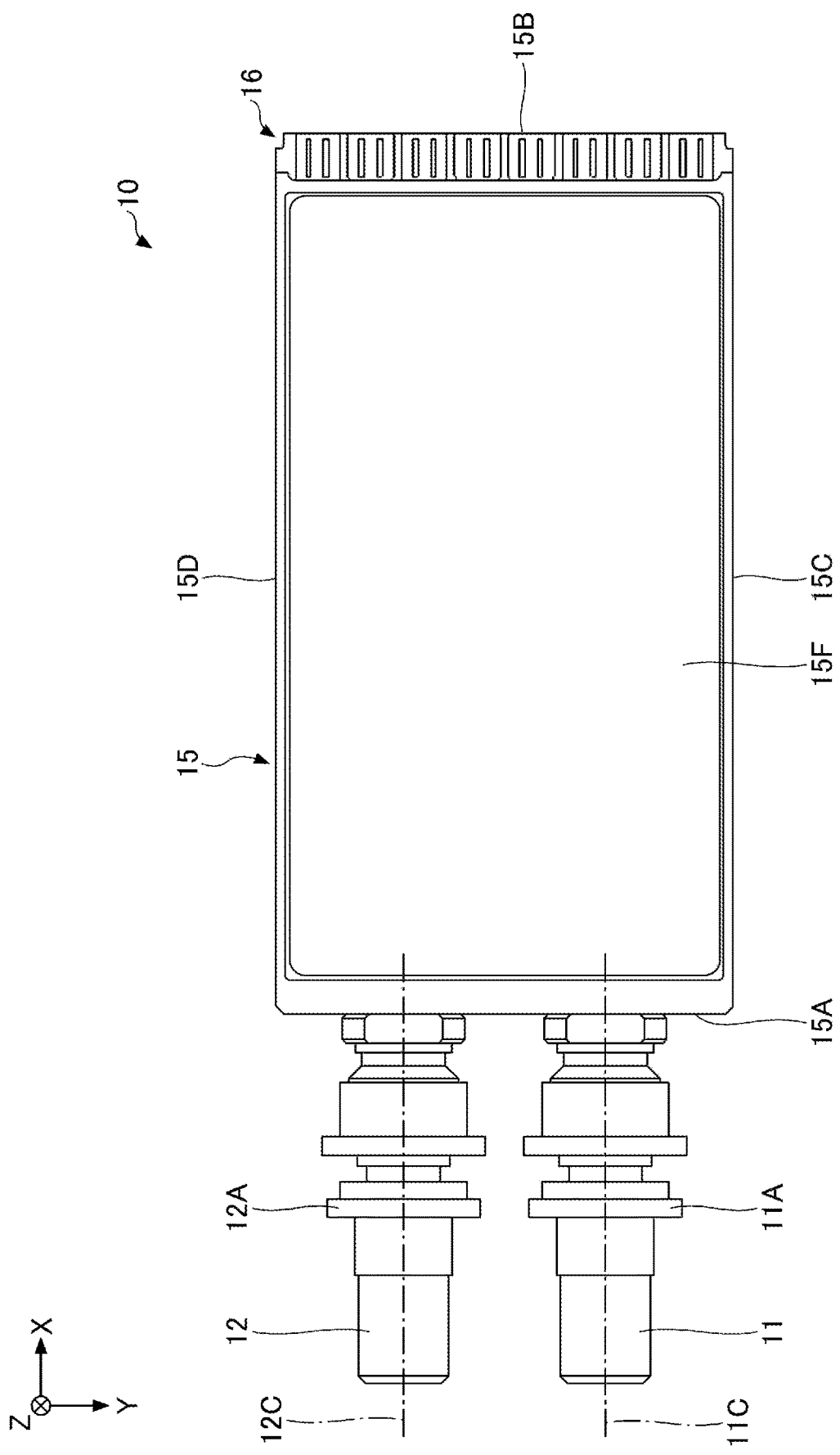
FIG. 3 is a bottom view illustrating an IC-TROSA.

Next, the IC-TROSA 10 will be described. FIG. 3 is a bottom view illustrating the IC-TROSA 10. Specifications of the IC-TROSA 10 are determined by the Optical Internetworking Forum (OIF), which is an industry organization. The IC-TROSA 10 may be categorized into two types, namely, type 1 and type 2, depending on differences in the outer shape, and FIG. 3 illustrates the IC-TROSA 10 of the type 2.

The IC-TROSA 10 has a package 15, as illustrated in FIG. 3. A tunable laser, and an optical circuit element are accommodated in the package 15. The package 15 has a parallelepiped outer shape. The parallelepiped outer shape of the package 15 has a longitudinal direction along the X-axis direction, and a short direction along the Y-axis direction. The package 15 has a front surface 15A, a rear surface 15B, a side surface 15C, a side surface 15D, an upper surface 15E (refer to FIG. 2), and a lower surface 15F. The front surface 15A and the rear surface 15B are perpendicular to the X-axis direction, and the rear surface 15B is disposed at a position more toward the +X direction (rear) than the front surface 15A. For example, the rear surface 15B is parallel to the front surface 15A. The side surfaces 15C and 15D are perpendicular to the Y-axis direction, and the side surface 15C is disposed at a position more toward the +Y direction than the side surface 15D. For example, the side surface 15D is parallel to the side surface 15C. The front surface 15A is provided on the opposite side from the cage of the host system in the X-axis direction, and is an example of a first surface.

The IC-TROSA 10 further has a first sleeve 11 for the light transmission, and a second sleeve 12 for light reception. The first sleeve 11 and the second sleeve 12 are closely adjacent to each other, and extend in the −X direction from the front surface 15A. The first sleeve 11 and the second sleeve 12 have cylindrical outer shapes extending in a longitudinal direction, and center axes 11C and 12C along the longitudinal direction, respectively. For example, the center axis 11C of the first sleeve 11 is an optical axis of transmitting light transmitted from the first sleeve 11, and the center axis 12C of the second sleeve 12 is an optical axis of received light received by the second sleeve 12. For example, a distance between the center axis 11C of the first sleeve 11 and the center axis 12C of the second sleeve 12 in the Y-axis direction is preferably approximately 6.25 mm, and a distance between the center axis 11C of the first sleeve 11 and the center axis 12C of the second sleeve 12 in the Z-axis direction is preferably approximately 0.00 mm. That is, in the Z-axis direction, the center axis 11C of the first sleeve 11, and the center axis 11C of the second sleeve 12, are disposed approximately at the same position. The first sleeve 11 has a flange portion 11A contacted by a first clip 71 which will be described later makes contact, and the second sleeve 12 has a flange portion 12A contacted by the second clip 72 which will be described later makes contact. The IC-TROSA 10 is an example of the optical module. As will be described later, relative positions of the center axis 11C of the first sleeve 11 and the center axis 12C of the second sleeve 12 may deviate from a predetermined position along the front surface 15A.

The terminal group 16, including the plurality of electrical terminals, is provided at the rear end of the lower surface 15F of the IC-TROSA 10, and the other end (front end) of the FPC 31 is connected to the terminal group 16. A terminal group 17 (refer to FIG. 2), including a plurality of electrical terminals, is provided on the side surfaces 15C and 15D, and the other end (front end) of the FPC 32 is connected to the terminal group 17. The DSP 40 processes electrical signals related to a photoelectric conversion performed by the IC-TROSA 10, via an interconnection wiring formed on the wiring board 20 and the FPCs 31 and 32.

Inside the package 15 of the IC-TROSA 10, the tunable laser generates reference light. The reference light is Continuous Wave (CW) light, for example, and has a predetermined peak wavelength. The tunable laser can vary the peak wavelength of the reference light within a predetermined range. The optical circuit element modulates the light for transmission, split from the reference light, according to the electrical signal, thereby generating the transmitting light. The optical circuit element includes a Mach-Zehnder light modulator, for example. The transmitting light is output via the first sleeve 11. In addition, the optical circuit element causes the received light received via the second sleeve 12 to optically interfere with the light for reception, split from the reference light. The optical circuit element has a 90° hybrid, for example. Light generated by the interference is input to a light receiving element, and converted into an electrical signal. The optical circuit elements may be provided separately for the transmission and the reception. A function to convert the electrical signal received from the DSP 40 into the transmitting light corresponds to the function of the TOSA, and a function to convert the received light into the electrical signal and transmitting the electrical signal to the DSP 40 corresponds to the function of the ROSA.

Figure 4:
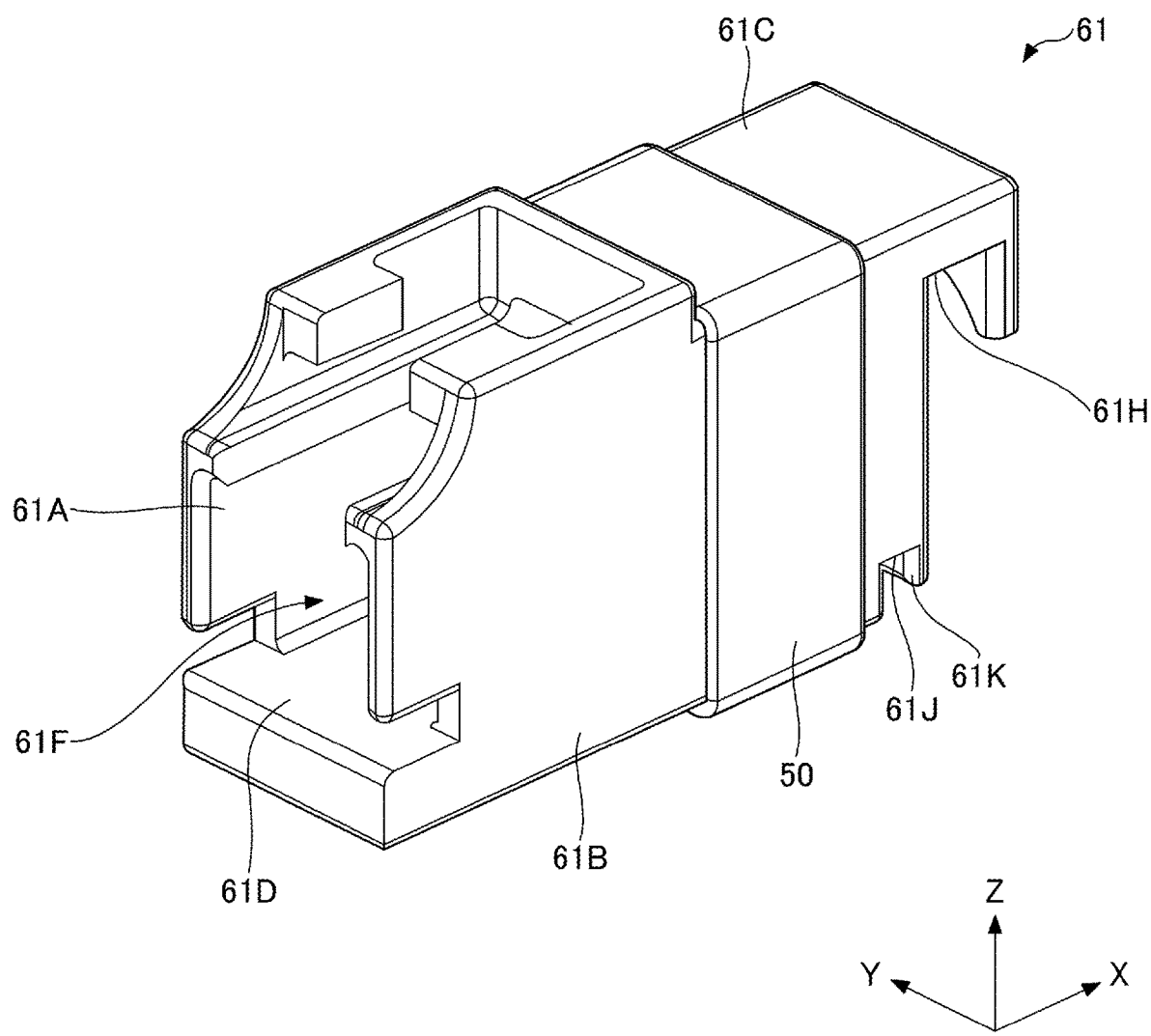
FIG. 4 is a perspective view (part 1) illustrating a first receptacle and a conductive resin.
Figure 5:
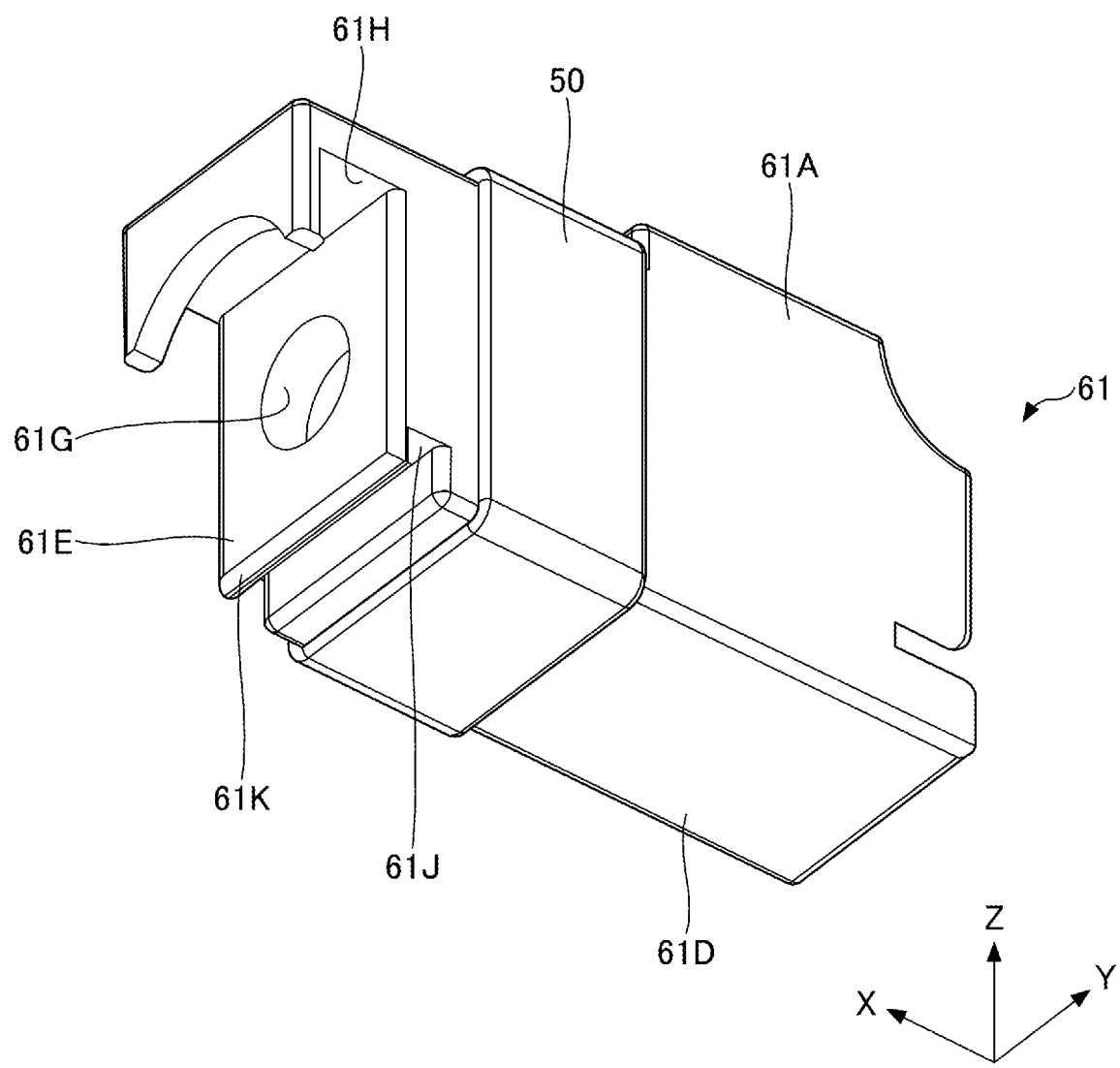
FIG. 5 is a perspective view (part 2) illustrating the first receptacle and the conductive resin.
Figure 6:
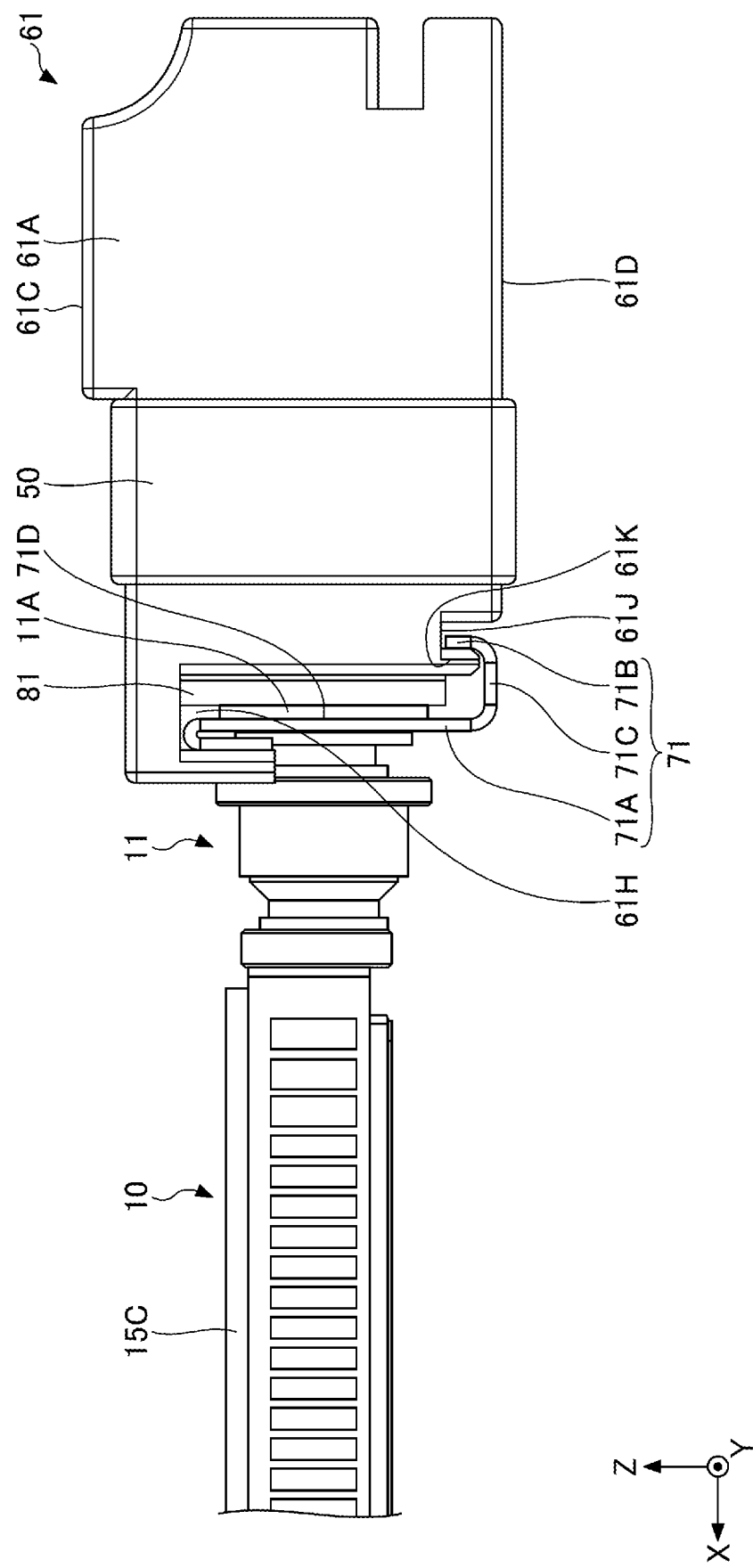
FIG. 6 is a side view illustrating the first receptacle and a periphery thereof.
Figure 7:
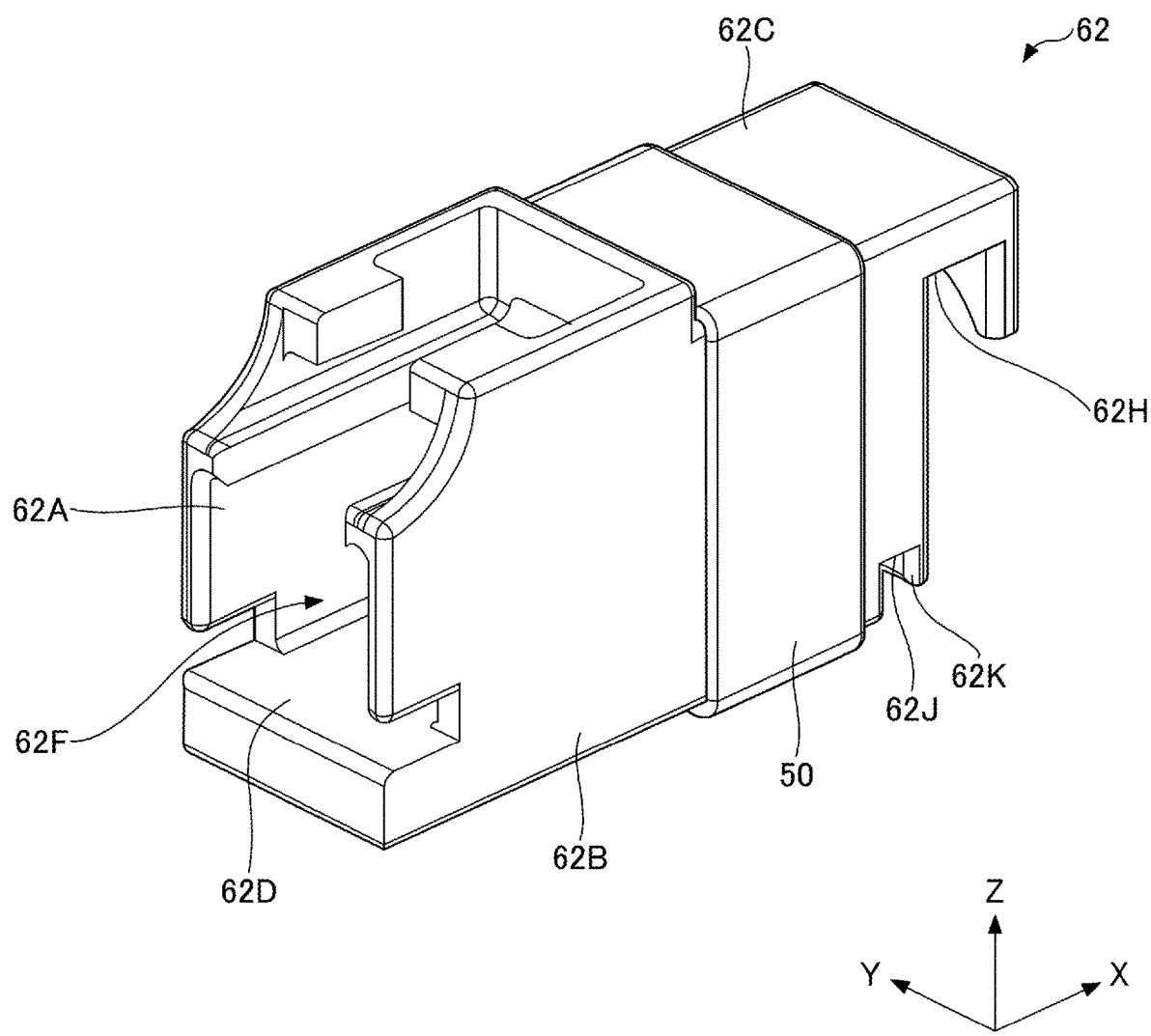
FIG. 7 is a perspective view (part 1) illustrating a second receptacle and the conductive resin.
Figure 8:
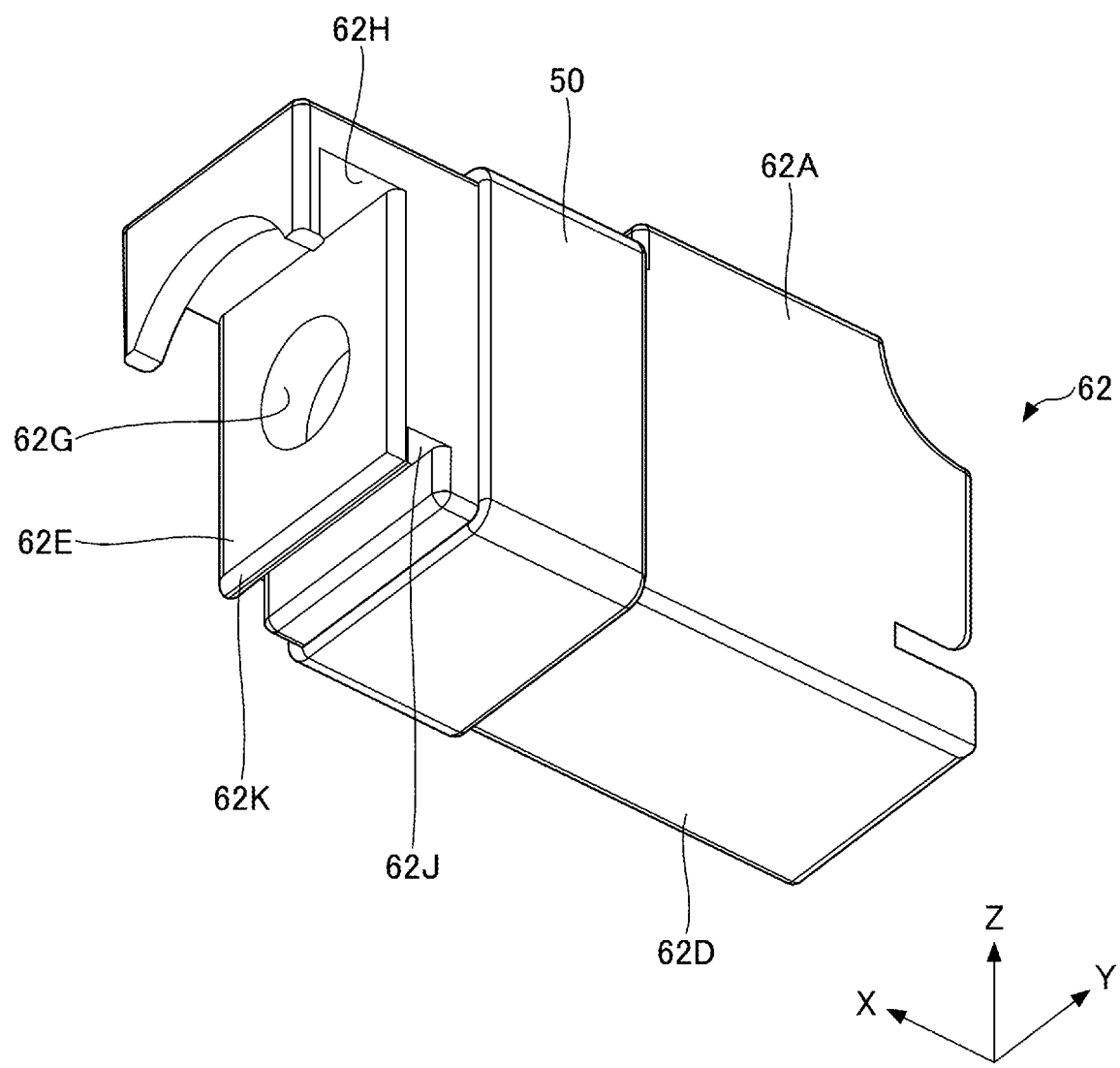
FIG. 8 is a perspective view (part 2) illustrating the second receptacle and the conductive resin.
Figure 9:
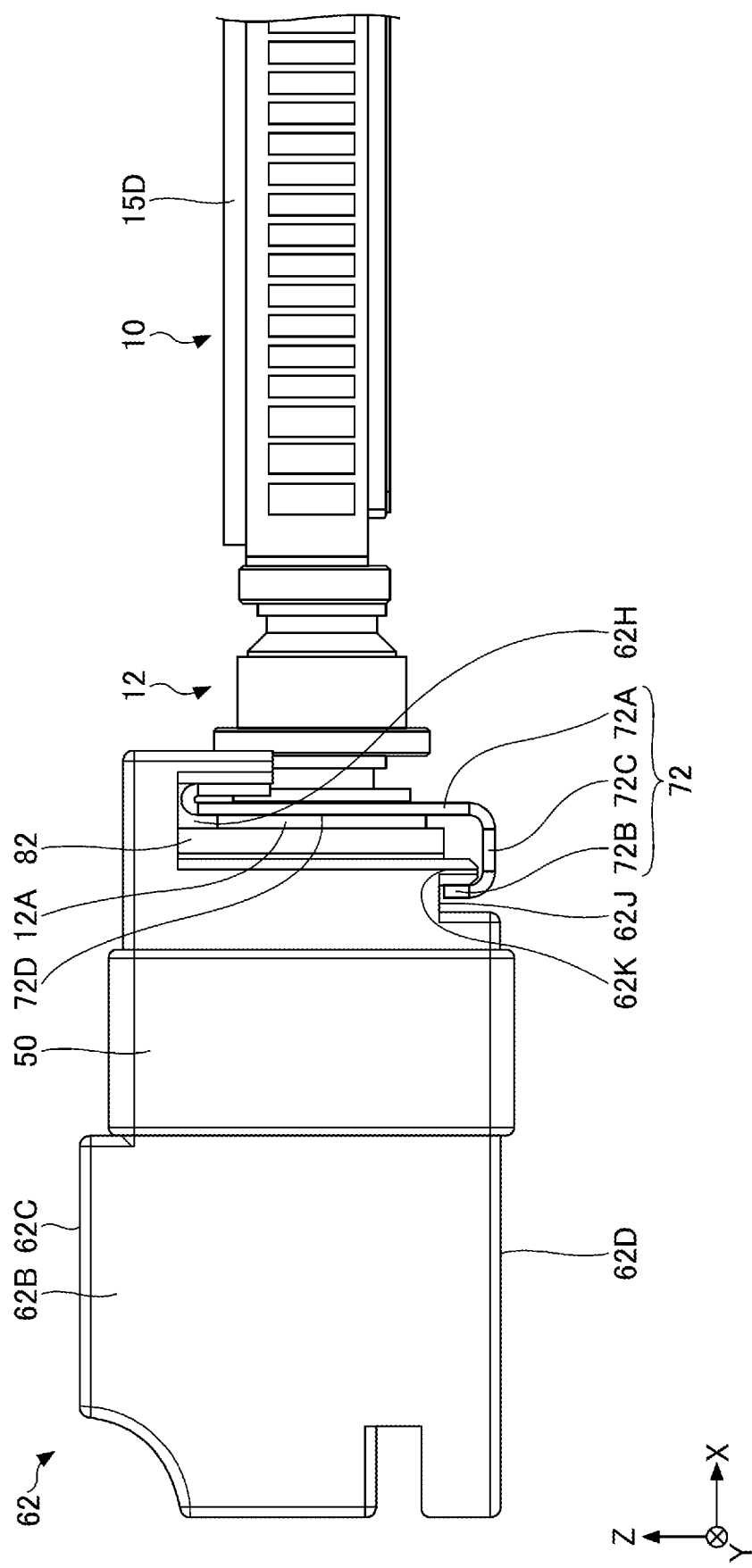
FIG. 9 is a side view illustrating the second receptacle and a periphery thereof.
Figure 10:
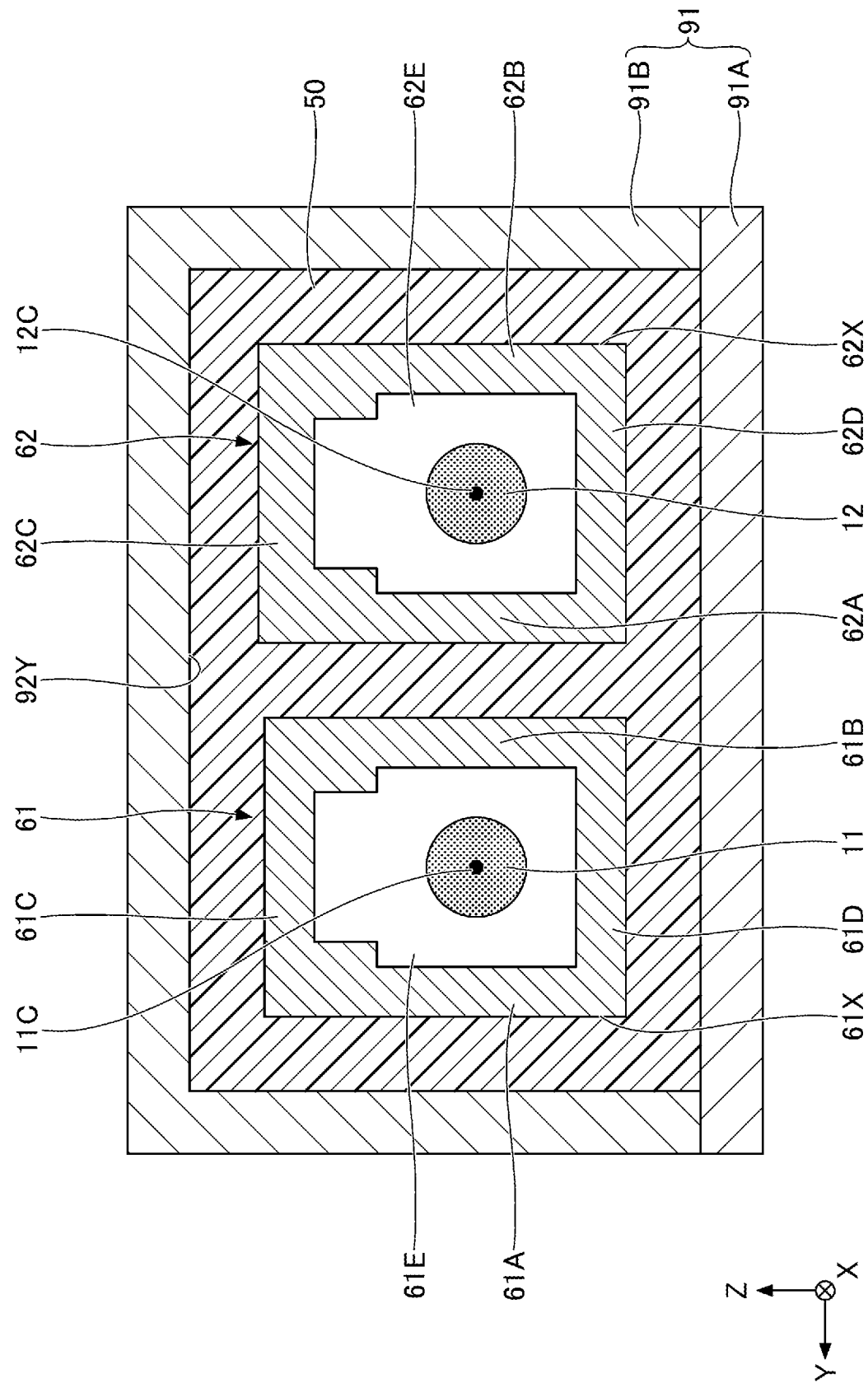
FIG. 10 is a cross sectional view illustrating positions of the first receptacle, the second receptacle, a first sleeve, and a second sleeve inside the housing.

The first receptacle 61 and the second receptacle 62 are accommodated in the accommodating part 92 of the housing 91. Configurations of the first receptacle 61, the second receptacle 62, and surrounding configurations will now be described. FIG. 4 and FIG. 5 are perspective views illustrating the first receptacle 61 and a conductive resin 50. FIG. 6 is a side view illustrating the first receptacle 61 and a periphery thereof. FIG. 7 and FIG. 8 are perspective views illustrating the second receptacle 62 and the conductive resin 50. FIG. 9 is a side view illustrating the second receptacle 62 and a periphery thereof. FIG. 10 is a cross sectional view illustrating positions of the first receptacle 61, the second receptacle 62, the first sleeve 11, and the second sleeve 12 inside the housing 91.

As illustrated in FIG. 4 through FIG. 6, the first receptacle 61 has a sidewall 61A, a sidewall 61B, a sidewall 61C, a sidewall 61D, and a rear wall 61E. The sidewalls 61A and 61B are formed to be flat and perpendicular to the Y-axis direction, and the sidewall 61A is disposed at a position more toward the +Y direction than the sidewall 61B. The sidewalls 61C and 61D are formed to be flat and perpendicular to the Z-axis direction, and the sidewall 61C is disposed at a position more toward the +Z direction than the sidewall 61D. The rear wall 61E is famed to be flat and perpendicular to the X-axis direction. The sidewall 61C connects an end of the sidewall 61A along the +Z direction to an end of the sidewall 61B along the +Z direction end of sidewall 61B, while the sidewall 61D connects an end of the sidewall 61A along the −Z direction to an end of the sidewall 61B along the −Z direction. The rear wall 61E connects the respective ends of the sidewalls 61A, 61B, 61C, and 61D along the +X direction. The first receptacle 61 has an opening 61F at the respective ends of the sidewalls 61A, 61B, 61C, and 61D along the −X direction. The optical connector provided on the tip of the optical fiber is inserted into the opening 61F. The rear wall 61E has a hole 61G for receiving the first sleeve 11. The first sleeve 11 is inserted into the hole 61G from the +X direction. The opening 61F is formed so as to be exposed from the housing 91. Portions of the sidewalls 61A, 61B, 61C, and 61D forming the opening 61F are not accommodated in the accommodating part 92. A portion of the first receptacle 61 disposed at a position more toward the +X direction than the opening 61F is accommodated in the accommodating part 92. The conductive resin 50 illustrated in FIG. 4 through FIG. 6 is coated (or applied) and cured when fixing the first receptacle 61 inside the accommodating part 92, as will be described later. FIG. 4 through FIG. 6 illustrate that the portions coated with the conductive resin 50 are accommodated in the accommodating part 92.

A clip insertion part 61H, into which the first clip 71 is inserted, extends from the sidewall 61C in the +X direction of the rear wall 61E. A recess 61J which is recessed in the +Z direction, and a protrusion 61K which protrudes in the −Z direction with respect to the recess 61J, are formed at an end of the rear wall 61E along the −Z direction. One end of the first clip 71 is hooked onto the protrusion 61K to engage therewith. The protrusion 61K may be formed to spread to the sidewalls 61A and 61B.

As illustrated in FIG. 6, the first clip 71 includes a first plate portion 71A, a second plate portion 71B, and a connecting portion 71C. The first plate portion 71A includes a plate surface 71D which makes contact with the flange portion 11A of the first sleeve 11, and is inserted into the clip insertion part 61H in the +Z direction. The second plate portion 71B is hooked onto the protrusion 61K to engage therewith. The connecting portion 71C has a U-shape when viewed in the Y-axis direction, and connects the first plate portion 71A and the second plate portion 71B. The connecting portion 71C urges the first plate portion 71A and the second plate portion 71B in a direction to approach each other. A first elastic sheet 81 is sandwiched between the flange portion 11A and the rear wall 61E. The first plate portion 71A is inserted into the clip insertion part 61H, the second plate portion 71B is hooked onto the protrusion 61K, and the plate surface 71D of the first plate portion 71A presses the flange portion 11A toward the rear wall 61E. The first receptacle 61 is fixed to the first sleeve 11 while the first elastic sheet 81 is compressed by the flange portion 11A and the rear wall 61E. Hence, the first clip 71 presses the first receptacle 61 against the first sleeve 11 in the X-axis direction, and fixes the first receptacle 61 to the first sleeve 11. The first elastic sheet 81 may be formed of a conductive resin. The first elastic sheet 81 prevents an electromagnetic leak from between the first sleeve 11 and the first receptacle 61.

As illustrated in FIG. 7 through FIG. 9, the second receptacle 62 has a sidewall 62A, a sidewall 62B, a sidewall 62C, a sidewall 62D, and a rear wall 62E. The sidewalls 62A and 62B are formed to be flat and perpendicular to the Y-axis direction, and the sidewall 62A is disposed at a position more toward the +Y direction than the sidewall 62B. The sidewalls 62C and 62D are formed to be flat and perpendicular to the Z-axis direction, and the sidewall 62C is disposed at a position more toward the +Z direction than the sidewall 62D. The rear wall 62E is famed to be flat and perpendicular to the X-axis direction. The sidewall 62C connects an end of the sidewall 62A along the +Z direction to an end of the sidewall 62B along the +Z direction end of sidewall 61B, while the sidewall 62D connects an end of the sidewall 62A along the −Z direction to an end of the sidewall 62B along the −Z direction. The rear wall 62E connects the respective ends of the sidewalls 62A, 62B, 62C, and 62D along the +X direction. The second receptacle 62 has an opening 62F at the respective ends of the sidewalls 62A, 62B, 62C, and 62D along the −X direction. The optical connector provided on the tip of the optical fiber is inserted into the opening 62F. The rear wall 62E has a hole 62G for receiving the second sleeve 12. The second sleeve 12 is inserted into the hole 62G from the +X direction. The opening 62F is formed so as to be exposed from the housing 91. Portions of the sidewalls 62A, 62B, 62C, and 62D forming the opening 62F are not accommodated in the accommodating part 92. A portion of the second receptacle 62 disposed at a position more toward the +X direction than the opening 62F is accommodated in the accommodating part 92. The conductive resin 50 illustrated in FIG. 7 through FIG. 9 is coated (or applied) and cured when fixing the second receptacle 62 inside the accommodating part 92, as will be described later. FIG. 7 through FIG. 9 illustrate that the portions coated with the conductive resin 50 are accommodated in the accommodating part 92.

A clip insertion part 62H, into which the second clip 72 is inserted, extends from the sidewall 62C in the +X direction of the rear wall 62E. A recess 62J which is recessed in the +Z direction, and a protrusion 62K which protrudes in the −Z direction with respect to the recess 62J, are formed at an end of the rear wall 62E along the −Z direction. One end of the second clip 72 is hooked onto the protrusion 62K to engage therewith. The protrusion 62K may be formed to spread to the sidewalls 62A and 62B.

As illustrated in FIG. 9, the second clip 72 includes a first plate portion 72A, a second plate portion 72B, and a connecting portion 72C. The first plate portion 72A includes a plate surface 72D which makes contact with the flange portion 12A of the second sleeve 12, and is inserted into the clip insertion part 62H in the +Z direction. The second plate portion 72B is hooked onto the protrusion 62K to engage therewith. The connecting portion 72C has a U-shape when viewed in the Y-axis direction, and connects the first plate portion 72A and the second plate portion 72B. The connecting portion 72C urges the first plate portion 72A and the second plate portion 72B in a direction to approach each other. A second elastic sheet 82 is sandwiched between the flange portion 12A and the rear wall 62E. The first plate portion 72A is inserted into the clip insertion part 62H, the second plate portion 72B is hooked onto the protrusion 62K, and the plate surface 72D of the first plate portion 72A presses the flange portion 12A toward the rear wall 62E. The second receptacle 62 is fixed to the second sleeve 12 while the second elastic sheet 82 is compressed by the flange portion 12A and the rear wall 62E. Hence, the second clip 72 presses the second receptacle 62 against the second sleeve 12 in the X-axis direction, and fixes the second receptacle 62 to the second sleeve 12. The second elastic sheet 82 may be formed of a conductive resin. The second elastic sheet 82 prevents an electromagnetic leak from between the second sleeve 12 and the second receptacle 62.

For example, the external size of each of the first receptacle 61 and the second receptacle 62 is 5.75 mm along the Y-axis direction, and is 8.7 mm along the Z-axis direction. For example, a distance between the sidewall 61B of the first receptacle 61 and the sidewall 62A of the second receptacle 62 is 0.5 mm.

As illustrated in FIG. 10, the first receptacle 61 has an outer peripheral surface 61X, the second receptacle 62 has an outer peripheral surface 62X, and the accommodating part 92 has an inner peripheral surface 92Y. The first receptacle 61 and the second receptacle 62 are fixed to the housing 91 via the conductive resin 50 filled between the inner peripheral surface 92Y of the accommodating part 92 and the outer peripheral surfaces 61X and 62X of the first and second receptacles 61 and 62, respectively. For example, the size of the space inside the accommodating part 92 is 12.85 mm along the Y-axis direction, and is 9.4 mm along the Z-axis direction. For example, a thickness of the conductive resin 50 is 0.35 mm along both the Y-axis direction and the Z-axis direction. However, the thickness of the conductive resin 50 between the sidewall 61B of the first receptacle 61 and the sidewall 62A of the second receptacle 62 is 0.5 mm. The conductive resin 50 is also filled between the sidewall 61B of the first receptacle 61 and the sidewall 62A of the second receptacle 62. The conductive resin 50 includes a conductive filler, such as carbon particles, silver-based (Ag-based) particles, iron-based (Fe-based) particles, or the like, for example. The resin used for the conductive resin 50 may be a resin having adhesive properties, such as epoxy or the like, or a resin having flexibility, such as silicone or the like, for example. That is, the conductive resin 50 may be a conductive adhesive or a flexible conductive resin. The conductive resin 50 has flowability when filled between the inner peripheral surface 92Y of the accommodating part 92 and each of the outer peripheral surface 61X of the first receptacle 61 and the outer peripheral surface 62X of the second receptacle 62, and can be filled into relatively narrow gaps. The conductive resin 50 may be cured by heating, Ultra Violet (UV) irradiation, or the like, and does not easily deformed in the cured state, thereby exhibiting a sufficiently large mechanical strength (or stiffness).

Next, a method of assembling the optical transceiver 1 will be described. FIG. 11 through FIG. 19 are perspective views illustrating a method of assembling the optical transceiver 1 according to one embodiment.

Figure 11:
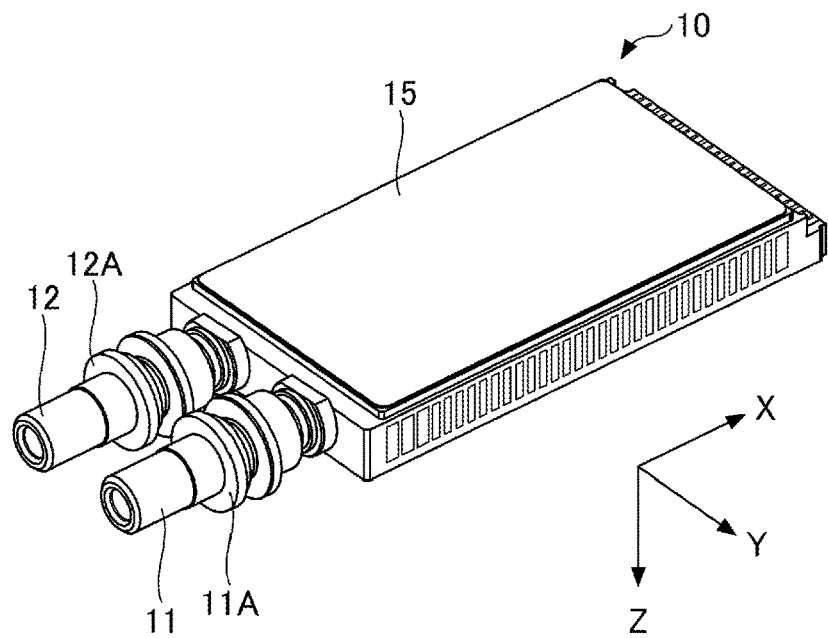
FIG. 11 is a perspective view (part 1) illustrating a method of assembling the optical transceiver according to one embodiment.

First, as illustrated in FIG. 11, the IC-TROSA 10 is prepared.

Figure 12:
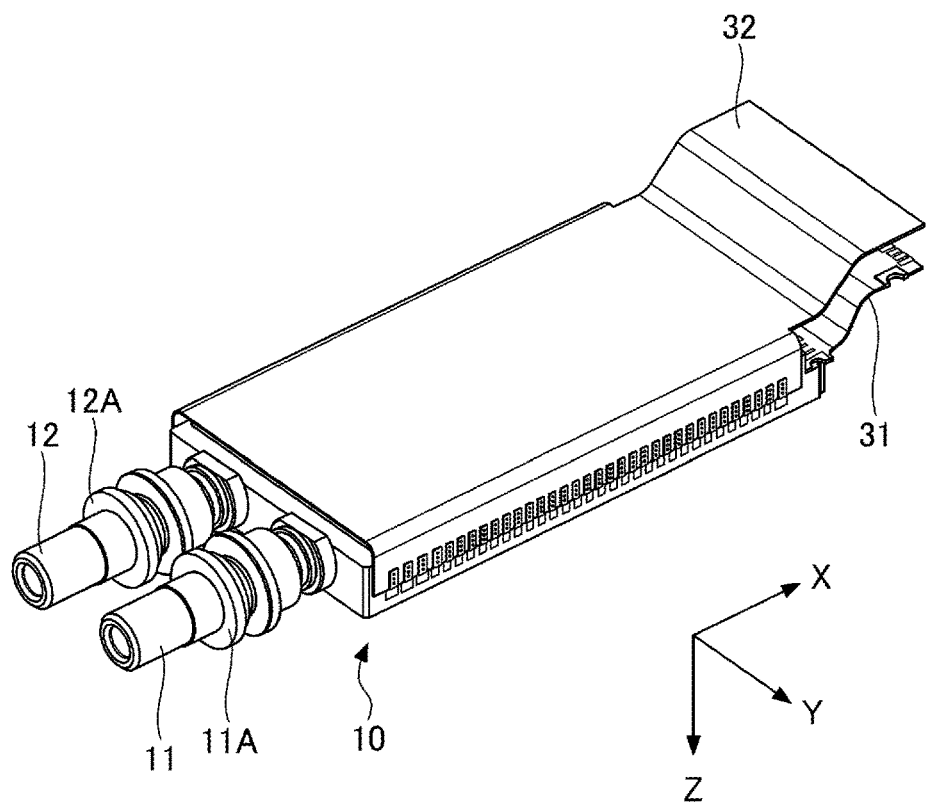
FIG. 12 is a perspective view (part 2) illustrating the method of assembling the optical transceiver according to one embodiment.

Next, as illustrated in FIG. 12, the FPCs 31 and 32 are connected to the IC-TROSA 10.

For example, a terminal group provided at the front end of the FPC 31 and the terminal group 16 are connected to each other via a solder material, so as to obtain a predetermined electrical connection. For example, the plurality of electrical terminals provided at the front end of the FPC 31 are connected to the plurality of electrical terminals forming the terminal group 16 of the IC-TROSA 10, respectively, to make a 1:1 electrical connection. In addition, a terminal group provided at the front end of the FPC 32 and the terminal group 17 are connected to each other via a solder material, so as to obtain a predetermined electrical connection. The plurality of electrical terminals forming the terminal group 17 are arranged in the X-axis direction at the side surfaces 15C and 15D of the IC-TROSA 10. For example, the plurality of electrical terminals at the front end of the FPC 32 are arranged in the X-axis direction, and are connected to the plurality of electrical terminals forming the terminal group 17, respectively, to make a 1:1 electrical connection. In order to make such an electrical connection, the front end of the FPC 32 has a portion covering the upper surface 15E of the IC-TROSA 10.

Figure 13:
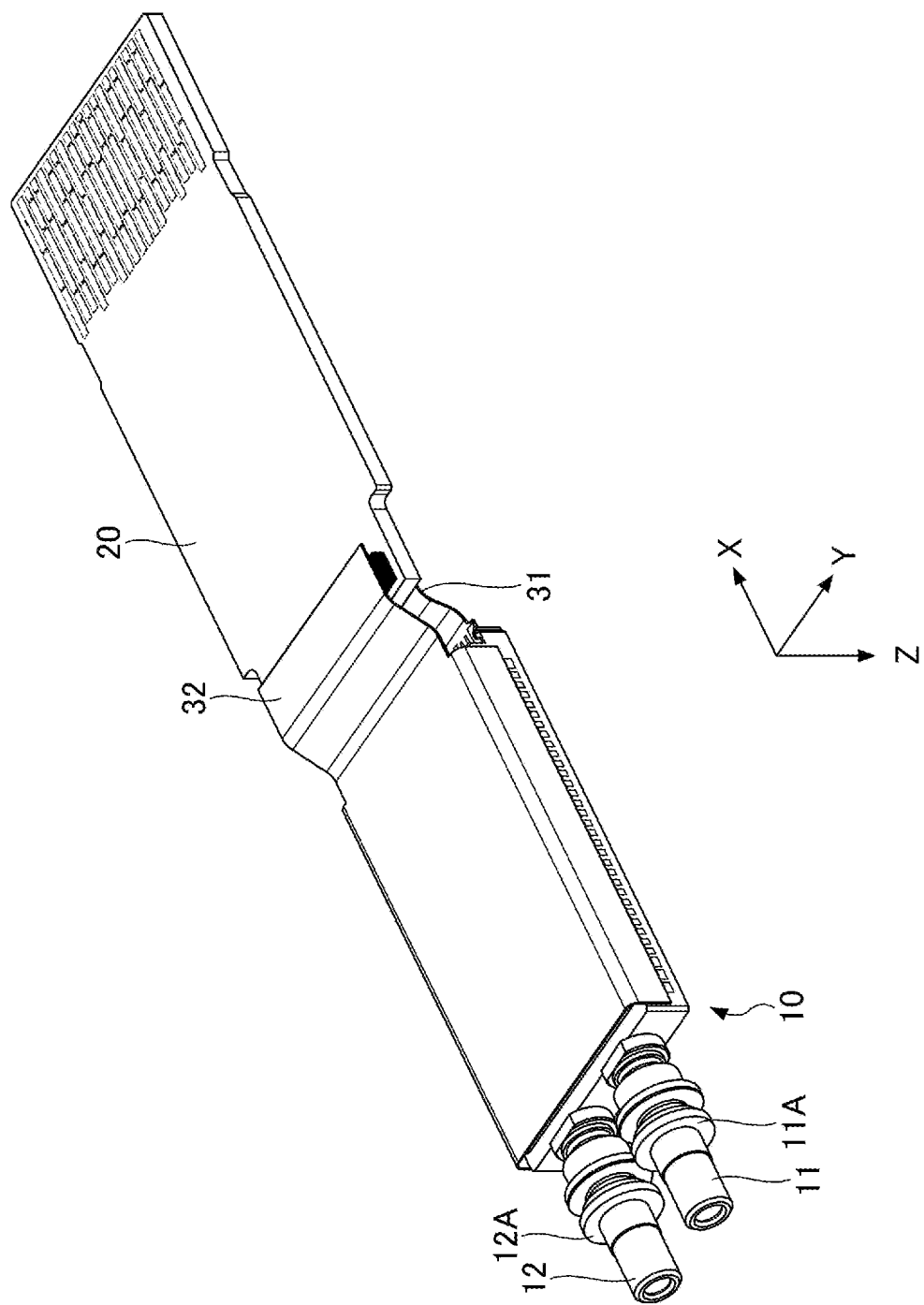
FIG. 13 is a perspective view (part 3) illustrating the method of assembling the optical transceiver according to one embodiment.

Next, as illustrated in FIG. 13, the wiring board 20 is connected to the FPCs 31 and 32. The DSP 40 (refer to FIG. 2) is mounted on the upper surface of the wiring board 20 before connecting the wiring board 20 to the FPCs 31 and 32. For example, at the front end of the wiring board 20, the terminal group provided on the upper surface of the wiring board 20 and the terminal group provided at the rear end of the FPC 31 are connected to each other via a solder material, so as to obtain a predetermined electrical connection. For example, the plurality of electrical terminals forming the terminal group at the rear end of the FPC 31 are connected to the plurality of electrical terminals provided on the upper surface of the wiring board 20 at the front end of the wiring board 20, respectively, to make a 1:1 electrical connection. In addition, at the front end of the wiring board 20, the terminal group provided on the lower surface of the wiring board 20 and the terminal group provided at the rear end of the FPC 32 are connected to each other via mating type connectors, so as to obtain a predetermined electrical connection. For example, the plurality of electrical terminals forming the terminal group at the rear end of the FPC 32 are connected to the plurality of electrical terminals provided on the lower surface of the wiring board 20 at the front end of the wiring board 20, respectively, to make a 1:1 electrical connection. The terminal group provided on the lower surface of the wiring board 20 at the front end of the wiring board 20 and the terminal group provided at the rear end of the FPC 32 may be connected to each other via a solder material.

Figure 14:
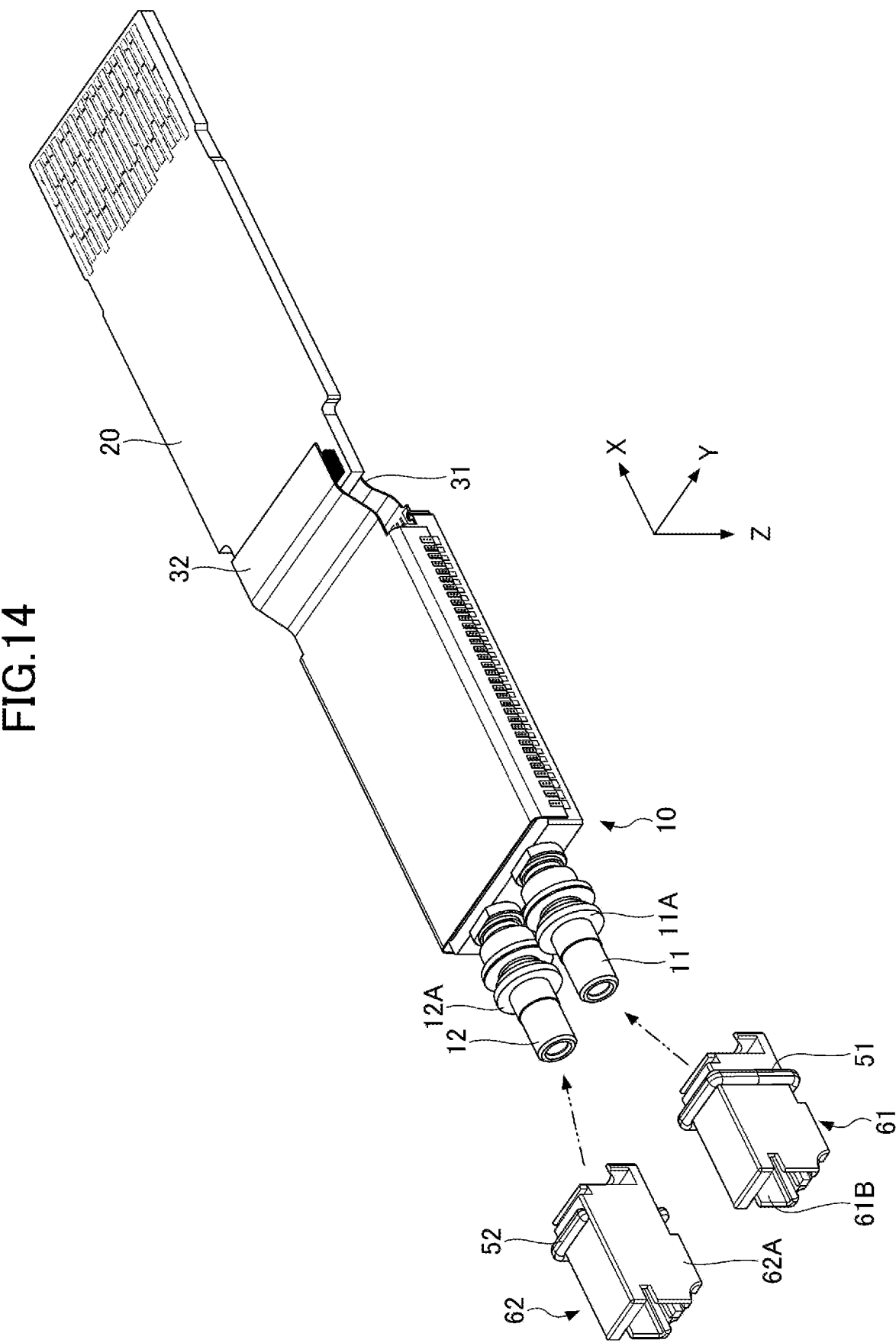
FIG. 14 is a perspective view (part 4) illustrating the method of assembling the optical transceiver according to one embodiment.

Next, as illustrated in FIG. 14, the first receptacle 61 and the second receptacle 62 are prepared. The conductive resin 51 is coated on the outer peripheral surface 61X of the first receptacle 61, and the conductive resin 52 is coated on the outer peripheral surface 62X of the second receptacle 62. The conductive resins 51 and 52 may be the same as the conductive resin 50 illustrated in FIG. 4 through FIG. 9. Because the conductive resin 50 is coated separately on the first receptacle 61 and the second receptacle 62 in this example, the conductive resins coated on the first receptacle 61 and the second receptacle 62 are designated by different reference numerals and described. The conductive resins 51 and 52 have flowability, and can be coated on the first and second receptacles 61 and 62, respectively. The conductive resins 51 and 52 include a conductive filler, such as carbon particles, silver-based (Ag-based) particles, iron-based (Fe-based) particles, or the like, for example. The resin used for the conductive resins 51 and 52 may be a resin having adhesive properties, such as epoxy or the like, or a resin having flexibility, such as silicone or the like, for example. The conductive resin 51 may be coated on the outer peripheral surface 61X of all of the sidewalls 61A, 61B, 61C, and 61D, for example. The conductive resin 52 may be coated on the outer peripheral surface 62X of all of the sidewalls 62A, 62B, 62C, and 62D, for example. Further, as illustrated in FIG. 14, if the conductive resin 51 is sufficiently coated on the sidewall 61B of the first receptacle 61, the coating of the sidewall 62A of the second receptacle 62 by the conductive resin 52 may be omitted (refer to FIG. 14). On the other hand, if the conductive resin 52 is sufficiently coated on the sidewall 62A of the second receptacle 62, the coating of the sidewall 61B of the first receptacle 61 by the conductive resin 51 may be omitted. The amount of coating of the conductive resins 51 and 52 may be to such an extent that, when the first receptacle 61 and the second receptacle 62 are sandwiched between the lower housing 91A and the upper housing 91B, at least the gap between the lower housing 91A and the upper housing 91B can be filled inside the accommodating part 92.

Figure 15:
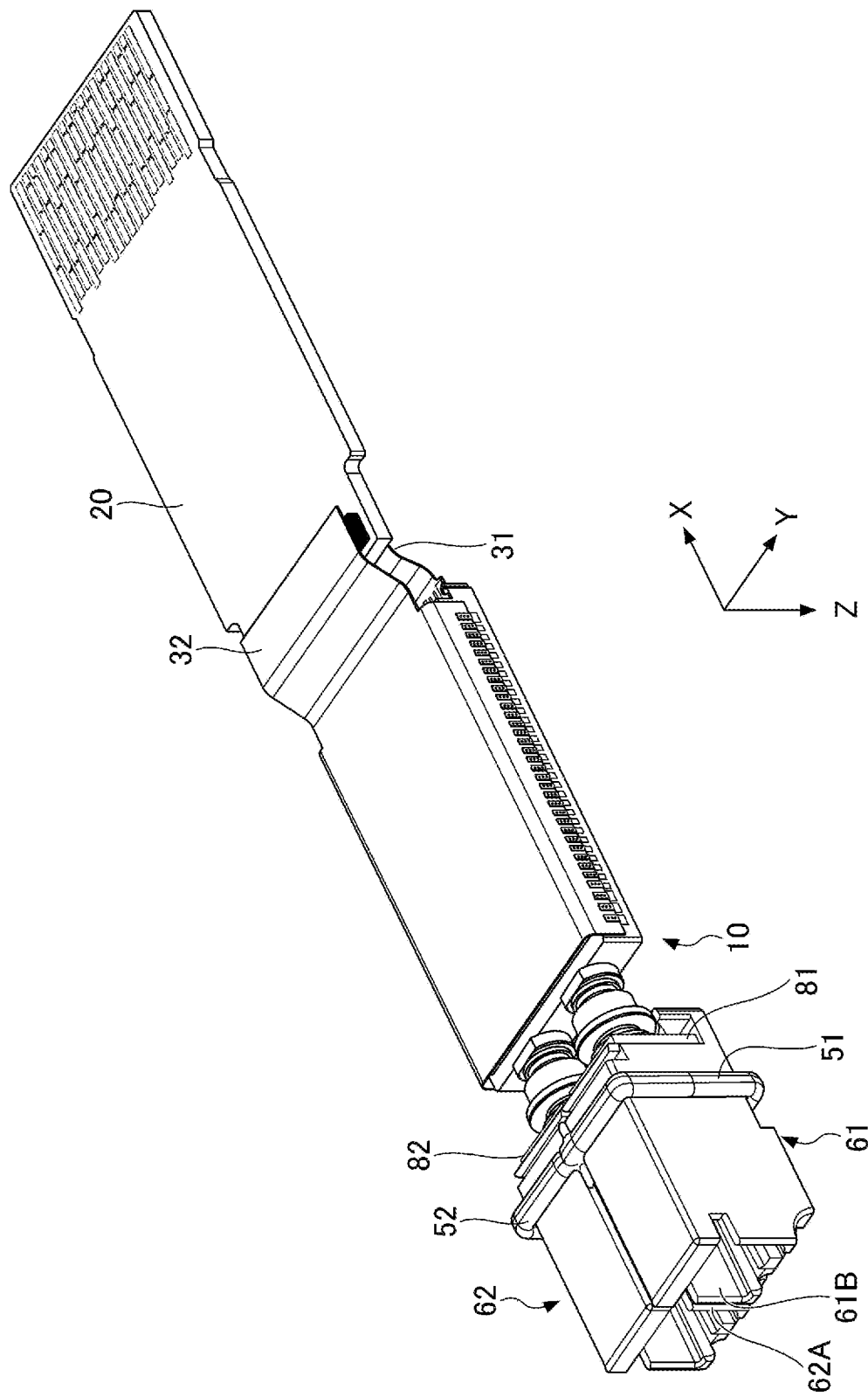
FIG. 15 is a perspective view (part 5) illustrating the method of assembling the optical transceiver according to one embodiment.

Next, as illustrated in FIG. 15, the first receptacle 61 is attached to the first sleeve 11 while the first sleeve 11 penetrates the hole 61G, and the second receptacle 62 is attached to the second sleeve 12 while the second sleeve 12 penetrates the hole 62G. In this state, the first elastic sheet 81 is disposed at a position to be sandwiched between the flange portion 11A and the rear wall 61E, and the second elastic sheet 82 is disposed at a position to be sandwiched between the flange portion 12A and the rear wall 62E. At least one of the conductive resin 51 on the sidewall 61B and the conductive resin 52 on the sidewall 62A is pressed by the sidewall 61B and the sidewall 62A, and the space between the sidewall 61B and the sidewall 62A is filled with the conductive resin.

Figure 16:
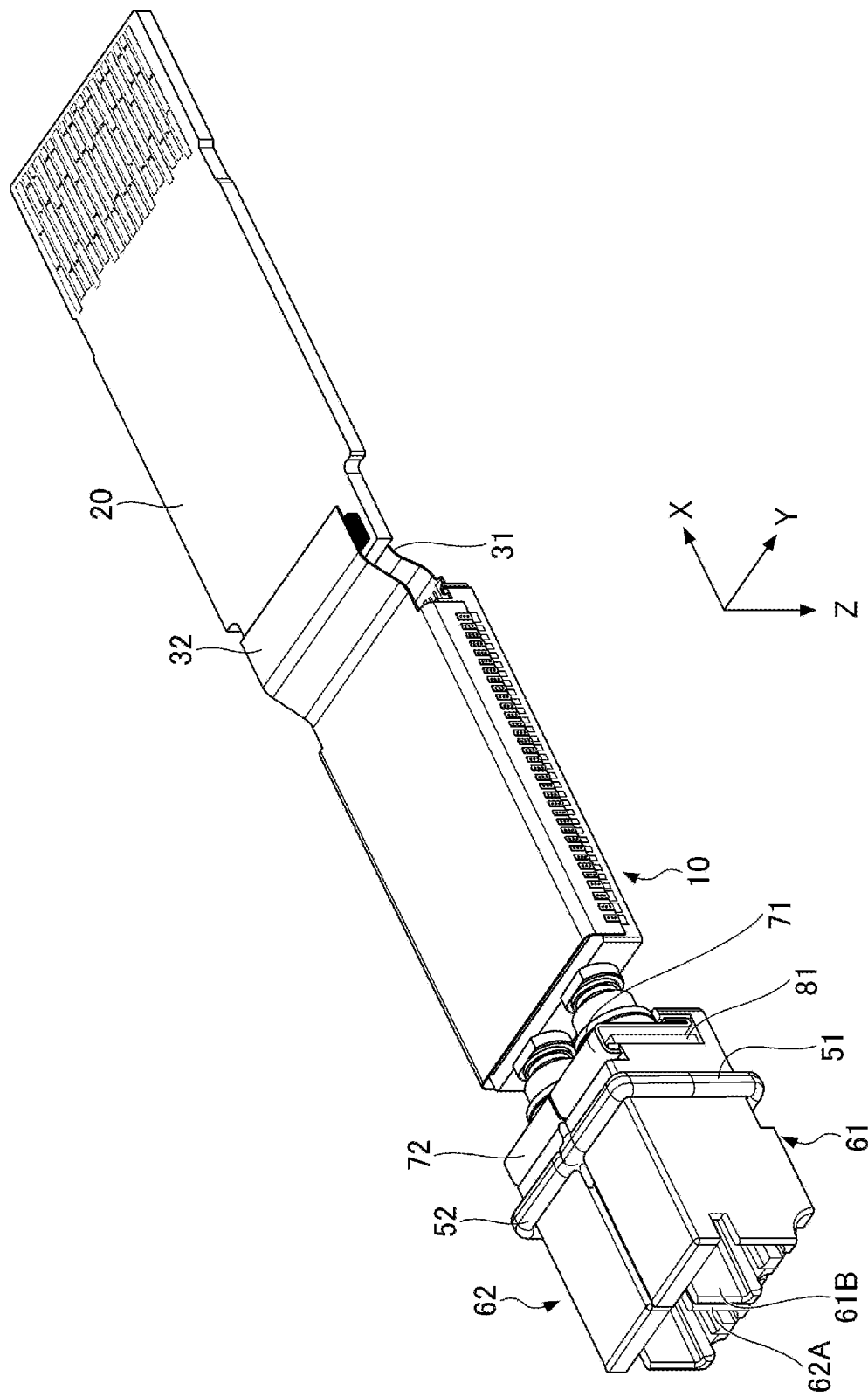
FIG. 16 is a perspective view (part 6) illustrating the method of assembling the optical transceiver according to one embodiment.

Next, as illustrated in FIG. 16, the first clip 71 is attached to the first sleeve 11 and the first receptacle 61, and the second clip 72 is attached to the second sleeve 12 and the second receptacle 62. As a result, the first receptacle 61 is fixed to the first sleeve 11 while the first elastic sheet 81 is compressed by the flange portion 11A and the rear wall 61E, and the second receptacle 62 is fixed to the second sleeve 12 while the second elastic sheet 82 is compressed by the flange portion 12A and the rear wall 62E.

Figure 17:
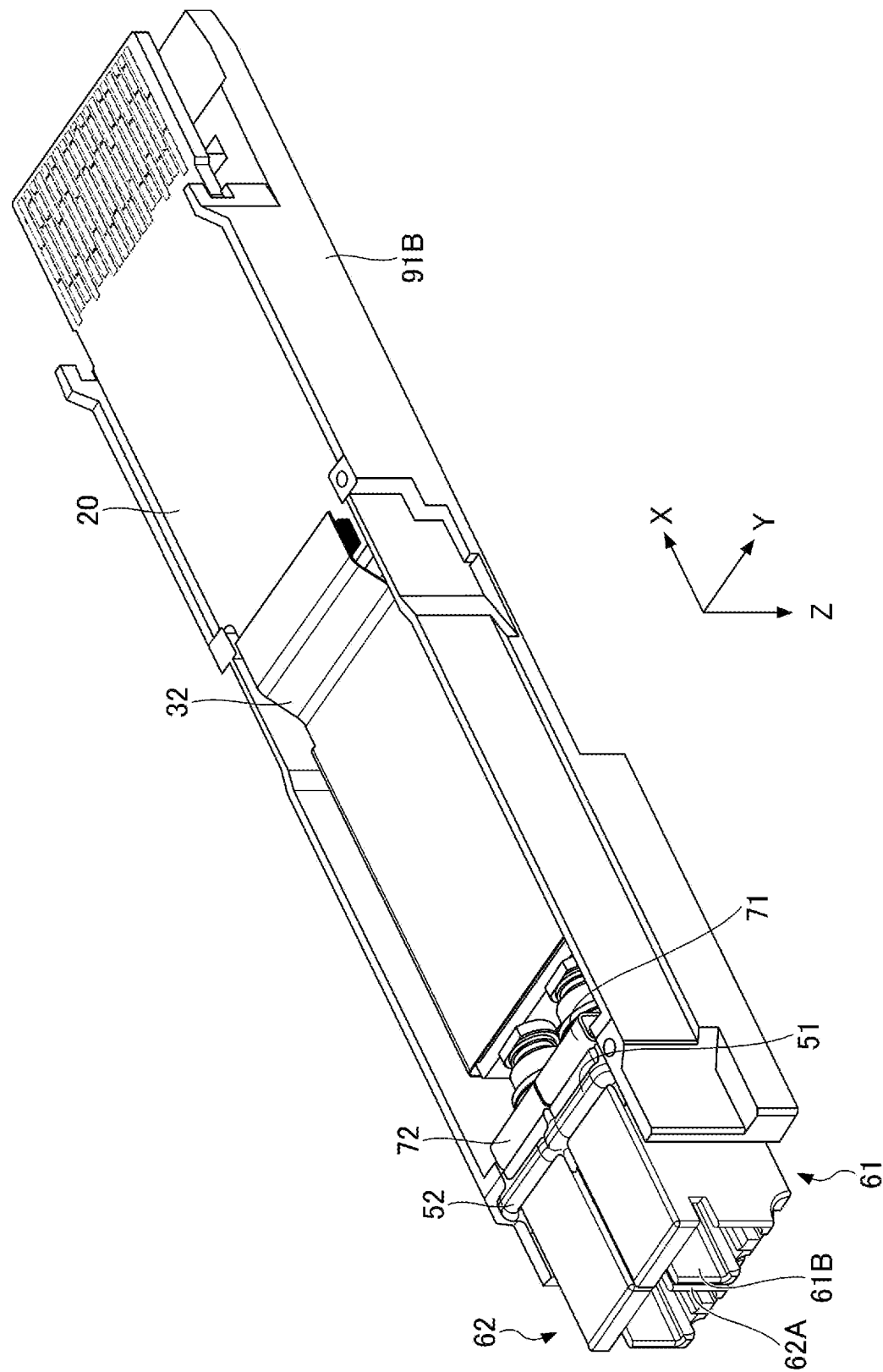
FIG. 17 is a perspective view (part 7) illustrating the method of assembling the optical transceiver according to one embodiment.

Next, as illustrated in FIG. 17, the IC-TROSA 10 having the first receptacle 61 and the second receptacle 62 attached thereto is accommodated in the interior space of the upper housing 91B, together with the wiring board 20. The conductive resin 51 on the sidewall 61C, and the conductive resin 52 on the sidewall 62C, are pressed by the sidewalls 61C and 62C and the upper housing 91B. The space between the upper housing 91B and the sidewalls 61C and 62C is filled with the conductive resin. The conductive resin 51 on the sidewall 61A is pressed by the sidewall 61A and the upper housing 91B, and the space between the sidewall 61A and the upper housing 91B is filled with the conductive resin. The conductive resin 52 on the sidewall 62B is pressed by the sidewall 62B and the upper housing 91B, and the space between the sidewall 62B and the upper housing 91B is filled with the conductive resin.

Figure 18:
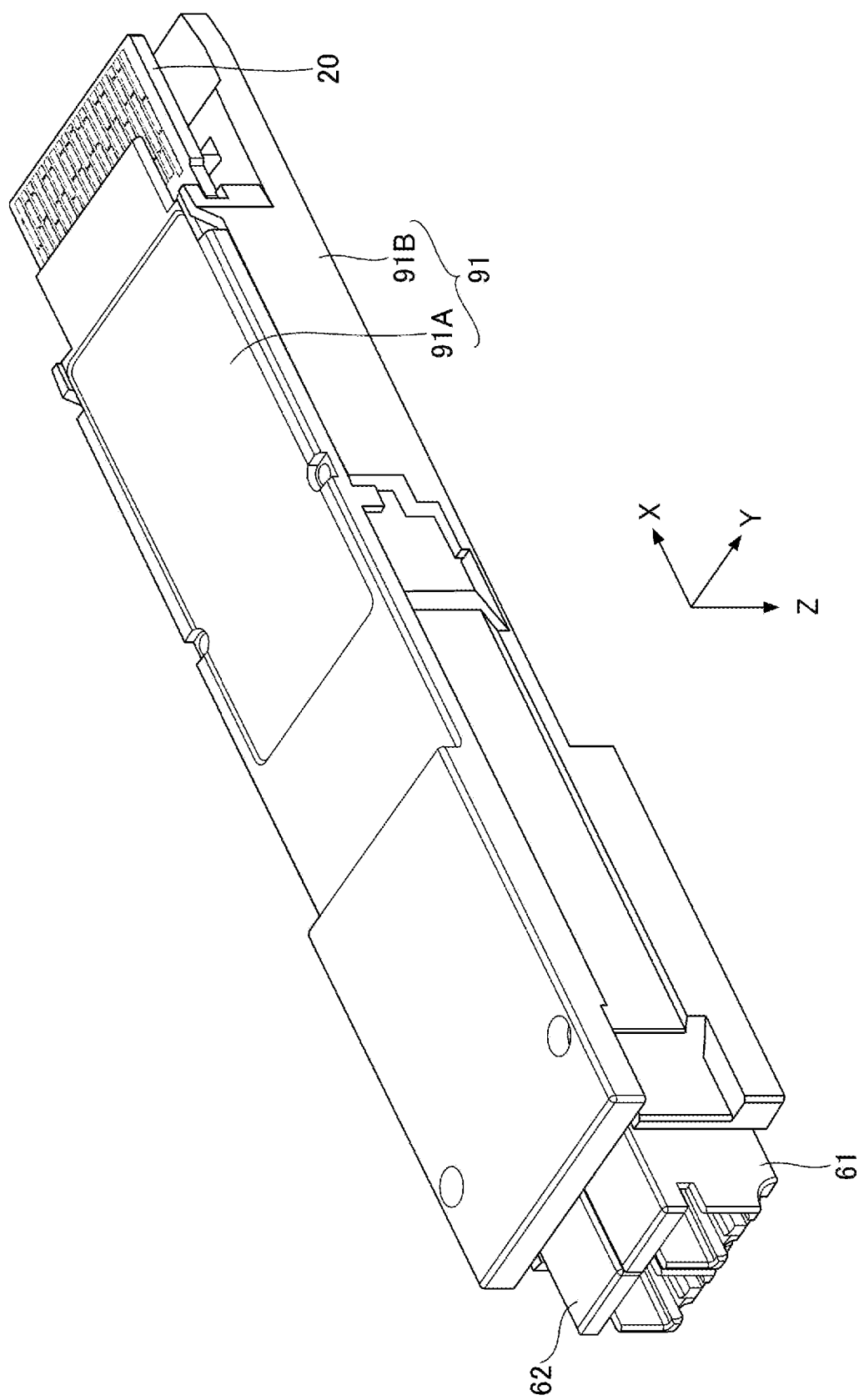
FIG. 18 is a perspective view (part 8) illustrating the method of assembling the optical transceiver according to one embodiment.

Next, as illustrated in FIG. 18, the lower housing 91A is fixed to the upper housing 91B. The conductive resin 51 on the sidewall 61D, and the conductive resin 52 on the sidewall 62D, are pressed by the sidewalls 61D and 62D and the upper housing 91B. The space between the upper housing 91B and the sidewalls 61D and 62D is filled with the conductive resin. As a result, as illustrated in FIG. 10, the conductive resin 50 formed by the conductive resins 51 and 52 is filled between the inner peripheral surface 92Y of the accommodating part 92 and each of the outer peripheral surface 61X of the first receptacle 61 and the outer peripheral surface 62X of the second receptacle 62. The conductive resin 50 is also filled between the sidewall 61B and the sidewall 62A.

Figure 19:
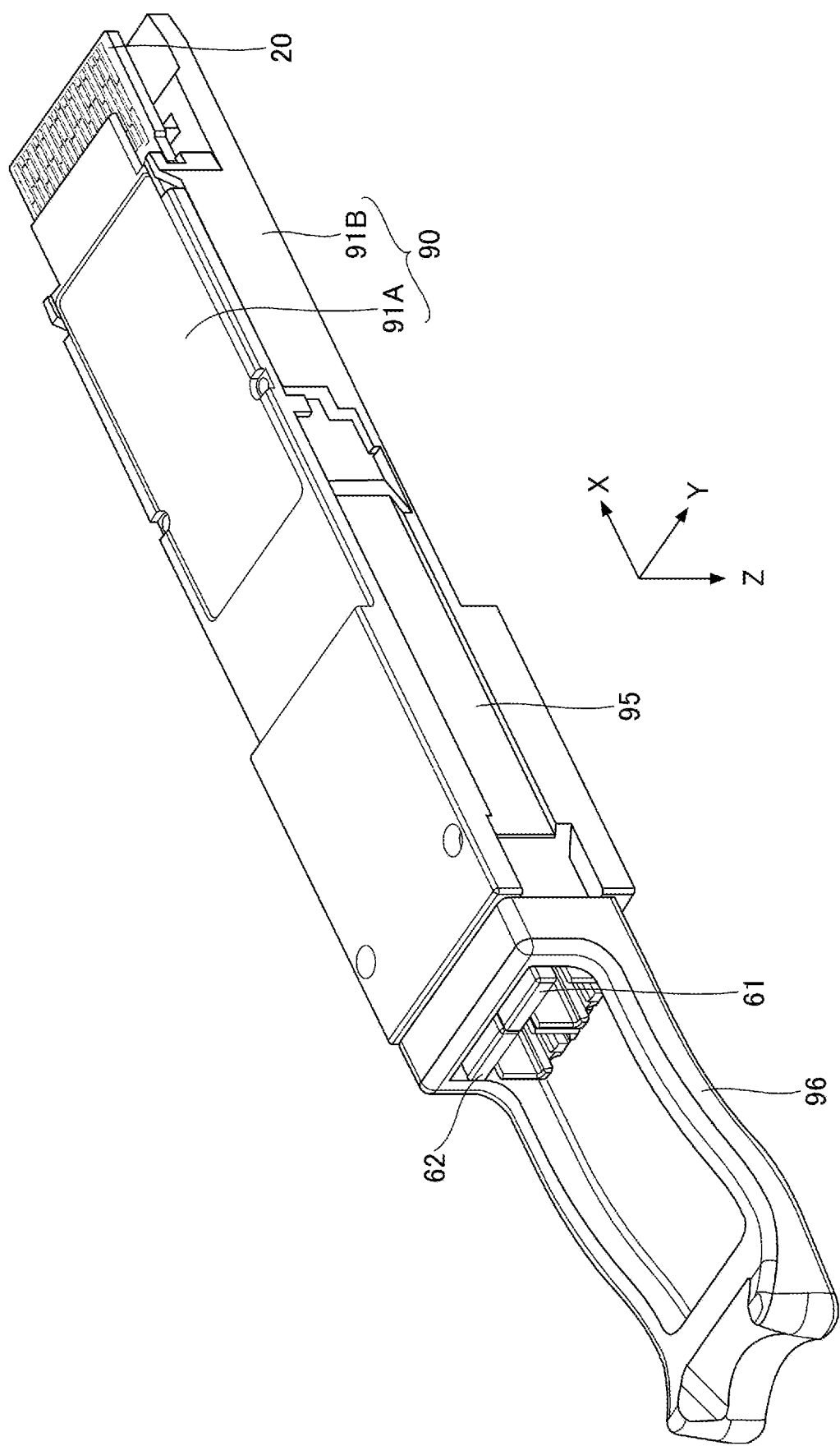
FIG. 19 is a perspective view (part 9) illustrating the method of assembling the optical transceiver according to one embodiment.

Next, as illustrated in FIG. 19, the slider 95 fixed to the pull tab 96 is slidably mounted on the upper housing 91B in a manner slidable in the X-axis direction.

The optical transceiver 1 according to this embodiment can be assembled as described above. The optical transceiver 1 can be attached to the host system by inserting the housing 91 into the cage of the host system along the longitudinal direction (X-axis direction), with the rear end of the wiring board 20, exposed from the housing 91, facing the cage of the host system. In a state where the optical transceiver 1 is attached to the host system, the optical transceiver 1 receives the power required for operation from the host system via the terminal group provided at the rear end of the wiring board 20, thereby enabling communication with the host system by the electrical signals. Further, in this state, the opening 61F of the first receptacle 61, the opening 62F of the second receptacle 62, and the pull tab 96 are exposed outside the cage of the host system. By connecting the optical connector provided on the tip end of the optical fiber to each of the first receptacle 61 and the second receptacle 62, it is possible to perform a two-way communication between the optical transceiver 1 and another optical transceiver via the optical fibers.

FIG. 10 illustrates a state where the first sleeve 11 and the second sleeve 12 are respectively disposed at predetermined positions on the YZ plane inside the accommodating part 92 when viewed in the −X direction. For example, the center axis 11C of the first sleeve 11, and the center axis 12C of the second sleeve 12, are parallel to the X-axis direction. The distance between the center axis 11C of the first sleeve 11 and the center axis 12C of the second sleeve 12 in the Y-axis direction is 6.25 mm, and the distance between the center axis 11C of the first sleeve 11 and the center axis 12C of the second sleeve 12 in the Z-axis direction is 0.00 mm, for example. The parallel state of two elements includes a state where the two elements are parallel within a tolerance of manufacturing error. For example, if the outer shape of the upper housing 91B is in line symmetry with respect to a plane of symmetry (XZ plane) which is perpendicular to the Y-axis direction, the distance between the side surface of the upper housing 91B in the −Y direction and the center axis 11C is set equal to the distance between the side surface of the upper housing 91B in the +Y direction and the center axis 12C. In addition, the center axis 11C and the center axis 12C are set to be in line symmetry with respect to the plane of symmetry which is perpendicular to the Y-axis direction. However, when the first sleeve 11 and the second sleeve 12 are attached to the front surface 15A during the assembling of the IC-TROSA 10, the first sleeve 11 and the second sleeve 12 are respectively moved and aligned on the front surface 15A, in order to optically couple to an optical system included within the IC-TROSA 10. As a result of this alignment, the positions of the center axis 11C of the first sleeve 11 and the center axis 12C of the second sleeve 12 on the front surface 15A may deviate from the respective predetermined positions due to variations introduced during the manufacturing process. The first sleeve 11 is aligned so that the optical axis of the transmitting light, parallel to the X-axis direction of the optical system included in the IC-TROSA 10, and the center axis 11C (optical axis) of the first sleeve 11 coincide on the front surface 15A (YZ plane). Because the coupling efficiency between the optical system included in the IC-TROSA 10 and the first sleeve 11 becomes appropriate in a state where the optical axis of the transmitting light of the optical system included in the IC-TROSA 10 and the center axis 11C (optical axis) of the first sleeve 11 coincide, the first sleeve 11 is fixed on the front surface 15A in this state. In addition, the second sleeve 12 is aligned so that the optical axis of the received light, parallel to the X-axis direction of the optical system included in the IC-TROSA 10, and the center axis 12C (optical axis) of the second sleeve 12 coincide on the front surface 15A (YZ plane). Because the coupling efficiency between the optical system included in the IC-TROSA 10 and the second sleeve 12 becomes appropriate in a state where the optical axis of the received light of the optical system included in the IC-TROSA 10 and the center axis 12C (optical axis) of the second sleeve 12 coincide, the second sleeve 12 is fixed on the front surface 15A in this state. For example, the alignment of the first sleeve 11 and the alignment of the second sleeve 12 may be performed independently. For example, both the center axis 11C of the first sleeve 11 and the center axis 12C of the second sleeve 12 may deviate in the +Y direction from the respective predetermined positions, or both the center axis 11C of the first sleeve 11 and the center axis 12C of the second sleeve 12 may deviate in the −Y direction from the respective predetermined positions.

In addition, the center axis 11C of the first sleeve 11 may deviate in the +Y direction from the predetermined position thereof, and the center axis 12C of the second sleeve 12 may deviate in the −Y direction from the predetermined position thereof. Moreover, the center axis 11C of the first sleeve 11 may deviate in the −Y direction from the predetermined position thereof, and the center axis 12C of the second sleeve 12 may deviate in the +Y direction from the predetermined position thereof. For example, both the center axis 11C of the first sleeve 11 and the center axis 12C of the second sleeve 12 may deviate in the +Z direction from the respective predetermined positions, or both the center axis 11C of the first sleeve 11 and the center axis 12C of the second sleeve 12 may deviate in the −Z direction from the respective predetermined positions. Further, the center axis 11C of the first sleeve 11 may deviate in the +Z direction from the predetermined position thereof, and the center axis 12C of the second sleeve 12 may deviate in the −Z direction from the predetermined position thereof. In addition, the center axis 11C of the first sleeve 11 may deviate in the −Z direction from the predetermined position thereof, and the center axis 12C of the second sleeve 12 may deviate in the +Z direction from the predetermined position thereof. The predetermined positions described above correspond to reference positions determined by the design for a case where there is no positional error due to the variations introduced during the manufacturing process. In the following description, the predetermined positions may also be referred to as the reference positions. In this embodiment, even in the case described above, a relative positional relationship between the center axis 11C of the first receptacle 61 and the first sleeve 11 can be maintained appropriately, and a relative positional relationship between the center axis 12C of the second receptacle 62 and the second sleeve 12 can be maintained appropriately.

Next, three examples, namely, a first example, a second example, and a third example will be described. In the first example, the center axis 11C of the first sleeve 11 is deviated from a first reference position in the +Y direction, and the center axis 12C of the second sleeve 12 is deviated from a second reference position in the −Y direction. In the second example, the center axis 11C of the first sleeve 11 is deviated from the first reference position in the −Y direction, and the center axis 12C of the second sleeve 12 is deviated from the second reference position in the +Y direction. In the third example, the center axis 11C of the first sleeve 11 is deviated from the first reference position in the +Z direction, and the center axis 12C of the second sleeve 12 is deviated from the second reference position in the −Z direction.

Figure 20:
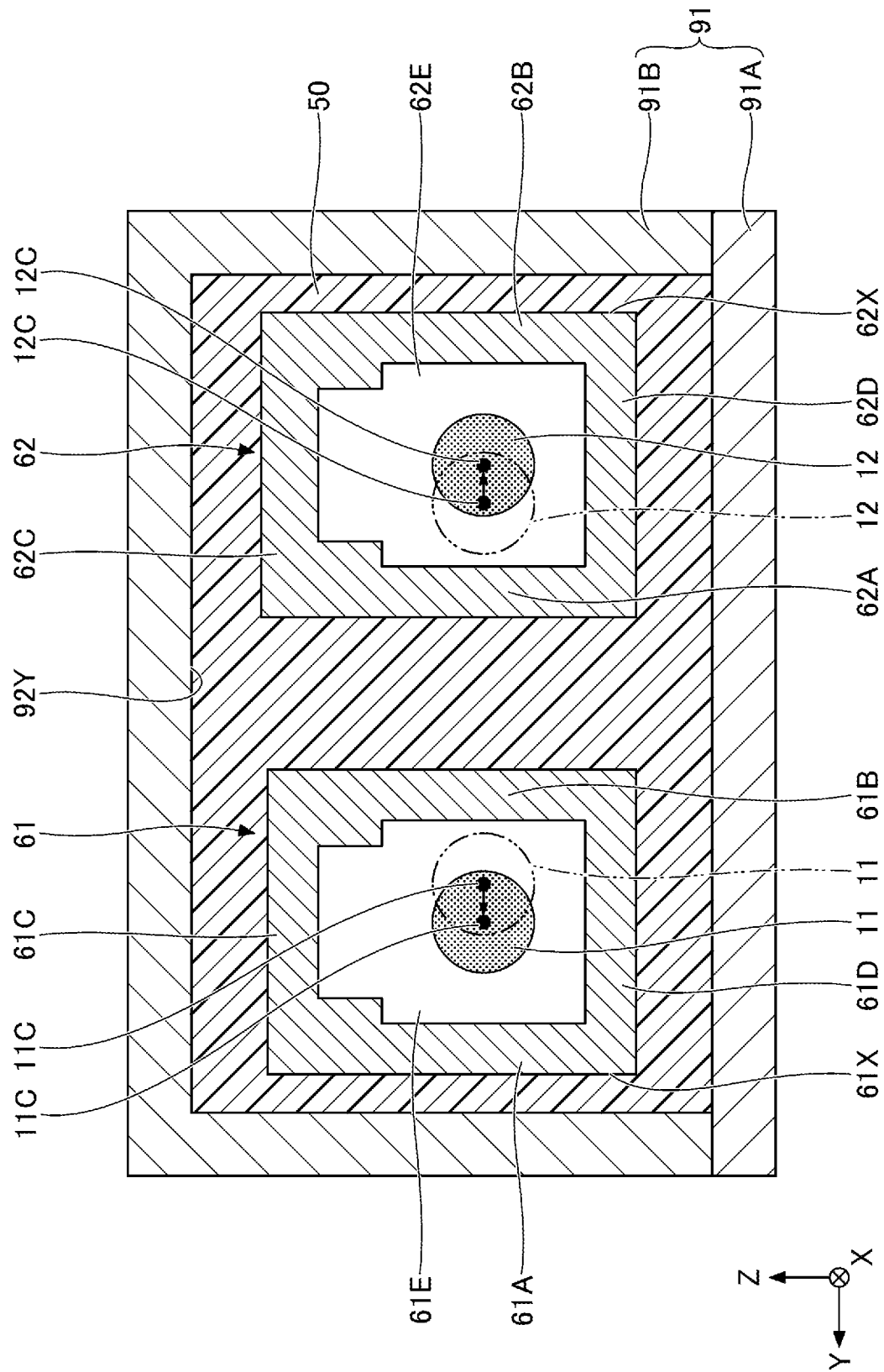
FIG. 20 is a cross sectional view illustrating the positions of the first receptacle, the second receptacle, the first sleeve, and the second sleeve inside the housing of a first example.

FIG. 20 is a cross sectional view illustrating the positions of the first receptacle 61, the second receptacle 62, the first sleeve 11, and the second sleeve 12 in the accommodating part 92 of the first example. In FIG. 20, the predetermined position (first reference position) of the first sleeve 11 with reference to the center axis 11C located at the first reference position, and the predetermined position (second reference position) of the second sleeve 12 with reference to the center axis 12C located at the second reference position, are indicated by two-dot chain lines, respectively. The predetermined positions are similarly indicated by two-dot chain lines in each of FIG. 21 and FIG. 22 which will be described later. In the first example, when the first receptacle 61 is attached to the first sleeve 11, and the second receptacle 62 is attached to the second sleeve 12 (refer to FIG. 15), the first receptacle 61 can be disposed at a position more toward the +Y direction than the position (first reference position) in FIG. 10, and the second receptacle 62 can be disposed at a position more toward the −Y direction than the position (second reference position) in FIG. 10, as illustrated in FIG. 20. As a result, the optical fiber for transmission can be optically coupled to the first sleeve 11 appropriately, and the optical fiber for reception can be optically coupled to the second sleeve 12 appropriately. Because the positions of the first sleeve 11 and the second sleeve 12 deviate from the respective first and second reference positions, the positions of the first receptacle 61 and the second receptacle 62, connecting to the first sleeve 11 and the second sleeve 12, respectively, also deviate from the respective first and second reference positions. The first receptacle 61 and the second receptacle 62 need to be fixed to the housing 91, but if a fixing member formed of a metal material or the like and having a predetermined shape, for example, is used to fix the first receptacle 61 and the second receptacle 62, the positional deviations from the respective first and second reference positions cannot be absorbed when fixing the first receptacle 61 and the second receptacle 62 to the housing 91. The first receptacle 61 and the second receptacle 62 can be fixed to the housing 91 even if the positions of the first receptacle 61 and the second receptacle 62 deviate from the respective first and second reference positions, by filling the conductive resin 50 having the flowability between the inner peripheral surface 92Y of the accommodating part 92 and each of the outer peripheral surfaces 61X and 62X of the first and second receptacles 61 and 62, and thereafter curing the conductive resin 50.

For example, the optical connector cannot be inserted into the opening 61F of the first receptacle 61, if the distance between the first sleeve 11 and the sidewall 61B of the first receptacle 61 becomes too short. As illustrated in FIG. 20, in the first example, the optical connector can be inserted into the opening 61F of the first receptacle 61 because the positions of the first sleeve 11 and the first receptacle 61 are appropriately maintained. In this state, the distance between the first receptacle 61 and the side surface of the upper housing 91B in the −Y direction is shorter than the corresponding distance in FIG. 10, but because the conductive resin 50 flows according to the deviation of the first receptacle 61 from the first reference position, the first receptacle 61 can be fixed at the position deviated from the first reference position in the state where the space between the first receptacle 61 and the side surface of the upper housing 91B in the −Y direction is filled with the conductive resin 50. In addition, the optical connector cannot be inserted into the opening 62F of the second receptacle 62, if the distance between the second sleeve 12 and the sidewall 62A of the second receptacle 62 becomes too short. As illustrated in FIG. 20, in the first example, the optical connector can be inserted into the opening 62F of the second receptacle 62 because the positions of the second sleeve 12 and the second receptacle 62 are appropriately maintained. In this state, the distance between the second receptacle 62 and the side surface of the upper housing 91B in the +Y direction is shorter the corresponding distance in FIG. 10, but because the conductive resin 50 flows according to the deviation of the second receptacle 62 from the second reference position, the second receptacle 62 can be fixed at the position deviated from the second reference position in the state where the space between the second receptacle 62 and the side surface of the upper housing 91B in the −Y direction is filled with the conductive resin 50.

Figure 21:
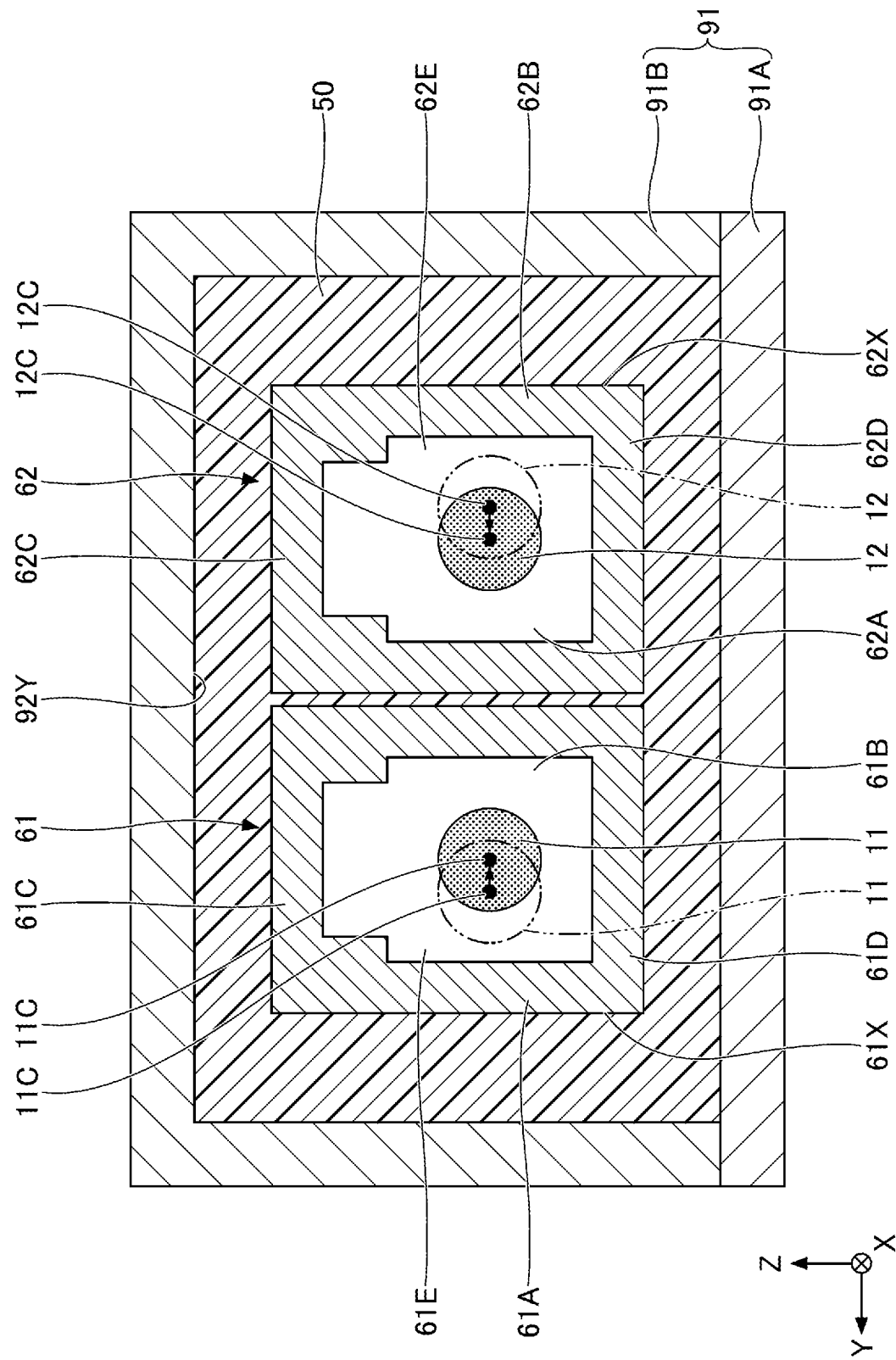
FIG. 21 is a cross sectional view illustrating the positions of the first receptacle, the second receptacle, the first sleeve, and the second sleeve inside the housing of a second example.
Figure 22:
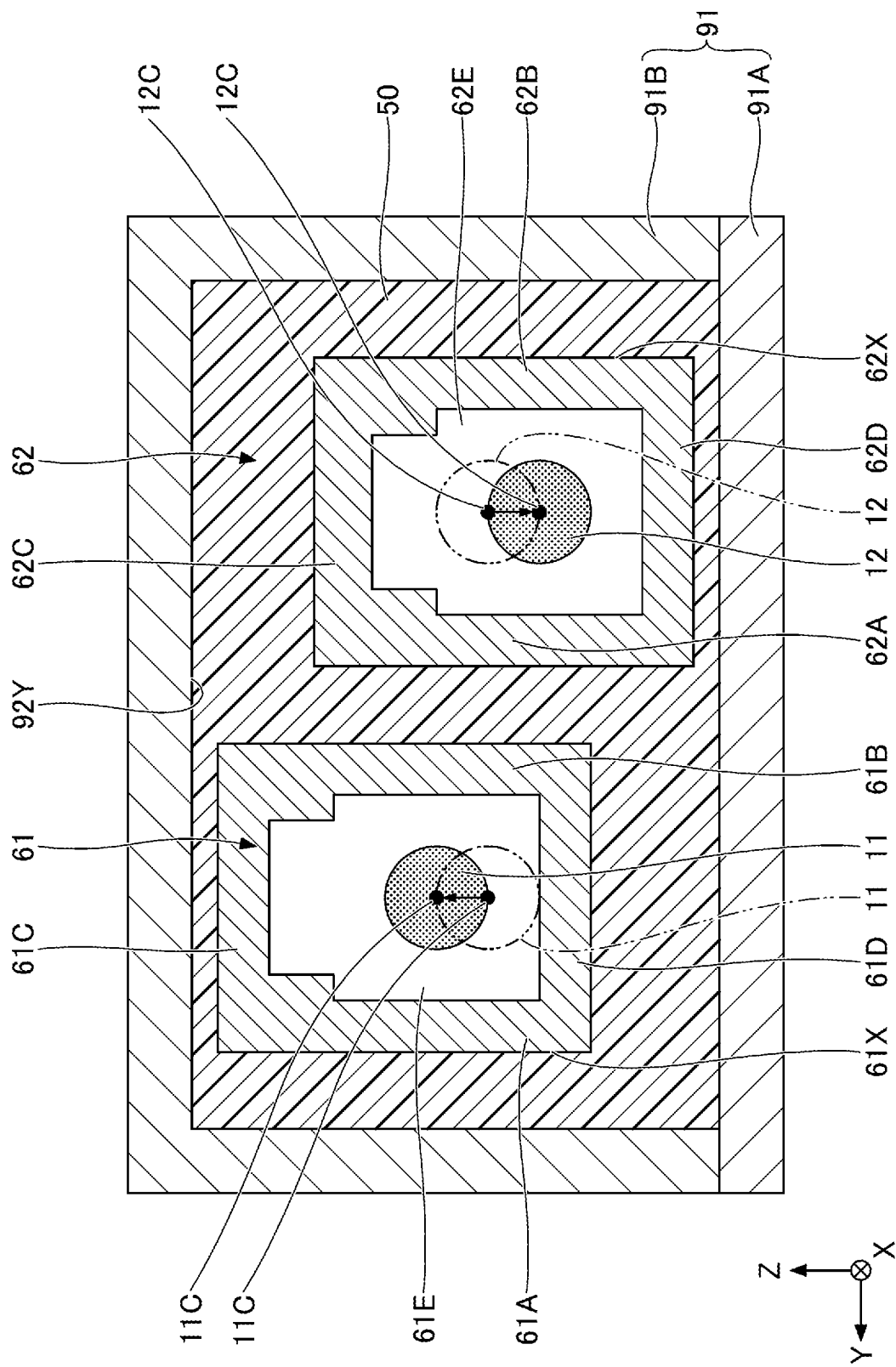
FIG. 22 is a cross sectional view illustrating the positions of the first receptacle, the second receptacle, the first sleeve, and the second sleeve inside the housing of a third example.

FIG. 21 is a cross sectional view illustrating the positions of the first receptacle 61, the second receptacle 62, the first sleeve 11, and the second sleeve 12 in the accommodating part 92 of the second example. In the second example, when the first receptacle 61 is attached to the first sleeve 11, and the second receptacle 62 is attached to the second sleeve 12 (refer to FIG. 15), the first receptacle 61 can be disposed at a position more toward the −Y direction than the position (first reference position) in FIG. 10, and the second receptacle 62 can be disposed at a position more toward the +Y direction than the position (second reference position) in FIG. 10, as illustrated in FIG. 21. As a result, the optical fiber for transmission can be optically coupled to the first sleeve 11 appropriately, and the optical fiber for reception can be optically coupled to the second sleeve 12 appropriately. Similar to the first example, because the positions of the first sleeve 11 and the second sleeve 12 deviate from the respective first and second reference positions, the positions of the first receptacle 61 and the second receptacle 62, connecting to the first sleeve 11 and the second sleeve 12, respectively, also deviate from the respective first and second reference positions. But the first receptacle 61 and the second receptacle 62 can be fixed to the housing 91 even if the positions of the first receptacle 61 and the second receptacle 62 deviate from the respective first and second reference positions, by filling the conductive resin 50 having the flowability between the inner peripheral surface 92Y of the accommodating part 92 and each of the outer peripheral surfaces 61X and 62X of the first and second receptacles 61 and 62, and thereafter curing the conductive resin 50. When FIG. 21 and FIG. 22 are compared, it may be seen that the positions of the first receptacle 61 and the second receptacle 62 along the Y-axis direction deviate from the respective first and second reference positions, and that these deviations cause changes in a minimum distance along the Y-axis direction between the inner peripheral surface 92Y and the outer peripheral surface 61X of the first receptacle 61, a minimum distance along the Y-axis direction between the inner peripheral surface 92Y and the outer peripheral surface 62X of the second receptacle 62, and a minimum distance along the Y-axis direction between the outer peripheral surface 61X of the first receptacle 61 and the outer peripheral surface 62X of the second receptacle 62. Because the conductive resin 50 has flowability when being filled, the conductive resin 50 can be filled at appropriate locations even if the first receptacle 61 and the second receptacle 62 deviate from the respective first and second reference positions. In addition, the filled conductive resin 50 can be cured to fix the first receptacle 61 and the second receptacle 62 to the housing 91.

FIG. 22 is a cross sectional view illustrating the positions of the first receptacle 61, the second receptacle 62, the first sleeve 11, and the second sleeve 12 in the accommodating part 92 of the third example. In the third example, when the first receptacle 61 is attached to the first sleeve 11, and the second receptacle 62 is attached to the second sleeve 12 (refer to FIG. 15), the first receptacle 61 can be disposed at a position more toward the +Z direction than the position (first reference position) in FIG. 10, and the second receptacle 62 can be disposed at a position more toward the −Z direction than the position (first reference position) in FIG. 10, as illustrated in FIG. 22. As a result, the optical fiber for transmission can be optically coupled to the first sleeve 11 appropriately, and the optical fiber for reception can be optically coupled to the second sleeve 12 appropriately. Similar to the second example, because the positions of the first sleeve 11 and the second sleeve 12 deviate from the respective first and second reference positions, the positions of the first receptacle 61 and the second receptacle 62, connecting to the first sleeve 11 and the second sleeve 12, respectively, also deviate from the respective first and second reference positions. But the first receptacle 61 and the second receptacle 62 can be positively fixed to the housing 91 even if the positions of the first receptacle 61 and the second receptacle 62 deviate from the respective first and second reference positions, by filling the conductive resin 50 having the flowability between the inner peripheral surface 92Y of the accommodating part 92 and each of the outer peripheral surfaces 61X and 62X of the first and second receptacles 61 and 62, and thereafter curing the conductive resin 50. For example, the conductive resin, which becomes excessive when the sidewall 61C of the first receptacle 61 becomes close to the inner peripheral surface 92Y along the +Z direction, flows to a portion which widens when the sidewall 61C of the first receptacle 61 becomes farther away from the inner peripheral surface 92Y along the −Z direction. In addition, the conductive resin, which becomes excessive when the sidewall 62D of the second receptacle 62 becomes close to the inner peripheral surface 92Y along the −Z direction, flows to a portion which widens when the sidewall 61D of the first receptacle 61 becomes farther away from the inner peripheral surface 92Y along the +Z direction. Accordingly, even if the positions of the first sleeve 11 and the second sleeve 12 deviate from the respective first and second reference positions, it is possible to fix the first receptacle 61 and the second receptacle 62, which deviated from the respective first and second reference positions in the state where the conductive resin is filled between the inner peripheral surface 92Y and the outer peripheral surfaces 61X and 62X, to the housing 91, while maintaining the positional relationship between the first receptacle 61 and the first sleeve 11, and the positional relationship between the second receptacle 62 and the second sleeve 12.

As described above, the first and second receptacles 61 and 62 are fixed with respect to the housing, by curing the conductive resin 50 filled between the inner peripheral surface 92Y of the accommodating part 92 and the respective outer peripheral surfaces 61X and 62X. Because the conductive resin 50 is electrically conductive, the conductive resin 50 can function as a shield with respect to electromagnetic interference. For this reason, although the inner peripheral surface 92Y is not in direct contact with the outer peripheral surfaces 61X and 62X, it is possible to reduce the electromagnetic leak from the inside of the housing 91 to the outside, via the gaps between the inner peripheral surface 92Y and each of the outer peripheral surfaces 61X and 62X. For example, even when a signal with a transmission rate of 400 Gbps is to be processed, it is possible to sufficiently reduce the electromagnetic leak from the inside of the optical transceiver 1 to the outside, such as an electromagnetic wave emitted from the DSP 40 to the outside, for example. Because the conductive resin 50 is also filled between the sidewall 61B of the first receptacle 61 and the sidewall 62A of the second receptacle 62, it is also possible to sufficiently reduce the electromagnetic leak via the space between the sidewall 61B and the sidewall 62A.

In addition, an excellent mechanical strength can be achieved by filling the conductive resin 50 between the inner peripheral surface 92Y and the outer peripheral surfaces 61X and 62X. For example, in the Telcordia standard GR-326-CORE test, a load of 2.3 kgf is applied in four directions (+Y direction, −Y direction, +Z direction, and −Z direction) perpendicular to the optical axis of the optical fiber, but an excellent performance of the optical transceiver 1 can be maintained even after such a load is applied. In a case where the conductive resin 50 is a conductive adhesive, the first receptacle 61 and the second receptacle 62 can easily be fixed to the accommodating part 92. In a case where the conductive resin 50 is a flexible conductive resin, the load on the accommodating part 92 can easily be relaxed when an external load is applied to the first receptacle 61 and the second receptacle 62.

Moreover, because the first clip 71 and the second clip 72 are used, the first receptacle 61 and the second receptacle 62 can be aligned to the first sleeve 11 and the second sleeve 12 in the X-axis direction with a high accuracy.

According to the present disclosure, it is possible to perform an appropriate alignment between the sleeve and the receptacle of the optical transceiver.

The present disclosure is not limited to the specific embodiments which are described in detail above, and various variations, modifications, and substitutions may be made within the scope of the present disclosure.

What is claimed is:

1. An optical transceiver, attachable and detachable along a first direction with respect to an external apparatus, the optical transceiver comprising:
    an optical module having a first surface intersecting the first direction, and a first sleeve and a second sleeve respectively extending from the first surface in a direction in which the optical transceiver is detached from the external apparatus;
    a housing having a parallelepiped shape extending along the first direction, and configured to accommodate the optical module;
    a first receptacle, connected to the first sleeve, and aligned according to a deviation of the first sleeve on the first surface from a first reference position; and
    a second receptacle, connected to the second sleeve, and aligned according to a deviation of the second sleeve on the first surface from a second reference position,
        wherein the housing has an accommodating part, disposed at one end of the housing along the first direction, and configured to accommodate the first receptacle and the second receptacle, and
        wherein the first receptacle and the second receptacle are fixed to the housing via a conductive resin filled between an inner peripheral surface of the housing and outer peripheral surfaces of the first receptacle and the second receptacle.

2. The optical transceiver as claimed in claim 1, wherein the conductive resin is a cured conductive adhesive.

3. The optical transceiver as claimed in claim 1, wherein the conductive resin is a cured flexible conductive resin.

4. The optical transceiver as claimed in claim 1, wherein the conductive resin is also filled between the first receptacle and the second receptacle.

5. The optical transceiver as claimed in claim 4, further comprising:
    a first clip configured to press and fix the first receptacle to the first sleeve in a direction in which the first sleeve extends; and
    a second clip configured to press and fix the second receptacle to the second sleeve in a direction in which the second sleeve extends.

6. The optical transceiver as claimed in claim 1, further comprising:
    a first clip configured to press and fix the first receptacle to the first sleeve in a direction in which the first sleeve extends; and
    a second clip configured to press and fix the second receptacle to the second sleeve in a direction in which the second sleeve extends.

7. The optical transceiver as claimed in claim 6, wherein each of the first sleeve and the second sleeve has a cylindrical outer shape.

8. The optical transceiver as claimed in claim 1, wherein each of the first sleeve and the second sleeve has a cylindrical outer shape.

* * * * *